United States Patent
Fujii et al.

(10) Patent No.: US 7,523,292 B2
(45) Date of Patent: Apr. 21, 2009

(54) ARRAY-TYPE PROCESSOR HAVING STATE CONTROL UNITS CONTROLLING A PLURALITY OF PROCESSOR ELEMENTS ARRANGED IN A MATRIX

(75) Inventors: Taro Fujii, Kanagawa (JP); Koichiro Furuta, Kanagawa (JP); Masato Motomura, Kanagawa (JP); Kenichiro Anjo, Kanagawa (JP); Yoshikazu Yabe, Kanagawa (JP); Toru Awashima, Kanagawa (JP); Takao Toi, Kanagawa (JP); Noritsugu Nakamura, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 148 days.

(21) Appl. No.: 10/682,830

(22) Filed: Oct. 10, 2003

(65) Prior Publication Data

US 2004/0103264 A1 May 27, 2004

(30) Foreign Application Priority Data

Oct. 11, 2002 (JP) ............................. 2002-299029

(51) Int. Cl.
*G06F 15/00* (2006.01)
*G06F 15/76* (2006.01)
(52) U.S. Cl. ...................................................... 712/10
(58) Field of Classification Search .............. 712/10–22
See application file for complete search history.

(56) References Cited

U.S. PATENT DOCUMENTS

| | | | | |
|---|---|---|---|---|
| 3,537,074 | A | * 10/1970 | Sankin et al. | 712/14 |
| 4,850,027 | A | 7/1989 | Kimmel | |
| 5,581,767 | A | * 12/1996 | Katsuki et al. | 712/11 |
| 6,145,072 | A | * 11/2000 | Shams et al. | 712/22 |
| 2001/0018733 | A1 | 8/2001 | Fujii et al. | |

FOREIGN PATENT DOCUMENTS

| | | |
|---|---|---|
| EP | 0 605 401 A2 | 7/1994 |
| JP | 2518902 | 4/1996 |
| JP | 2001-312481 | 11/2001 |

* cited by examiner

*Primary Examiner*—Eddie P Chan
*Assistant Examiner*—Brian P Johnson
(74) *Attorney, Agent, or Firm*—Foley & Lardner LLP

(57) ABSTRACT

A multiplicity of processor elements, which both individually execute data processing in accordance with instruction codes that have been set as data and for which mutual connection relations are switch-controlled, are arranged in matrix form, and the instruction codes of this multiplicity of processor elements are successively switched by a state control unit. The state control units are composed of a plurality of units that intercommunicate to realize linked operation, and the multiplicity of processor elements is divided into a number of element areas that corresponds to the number of state control units. The plurality of state control units are arranged for each of the plurality of element areas and are connected to the processor elements, whereby the plurality of state control units can individually control a plurality of small-scale state transitions, or the plurality of state control units can cooperate to control a single large-scale state transition.

43 Claims, 14 Drawing Sheets

FIG. 1
(PRIOR ART)
MANAGE BY TWO STCs
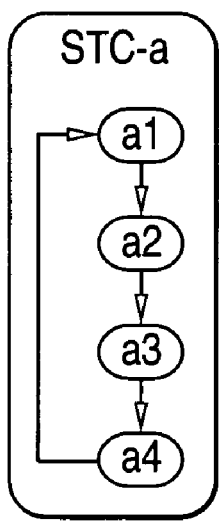
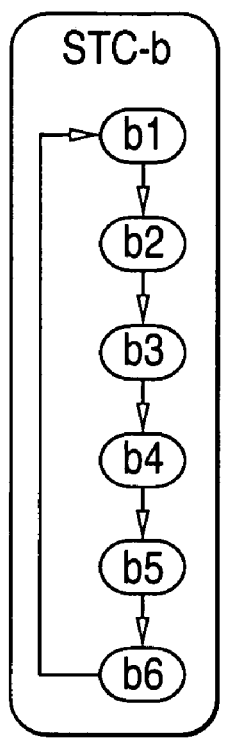
INTEGRATE ⇒
IN CASE OF INTEGRATION INTO ONE STC
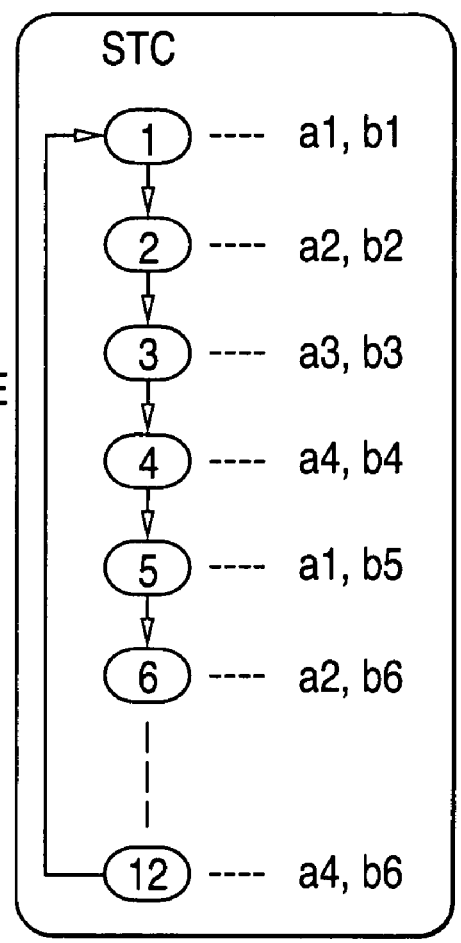

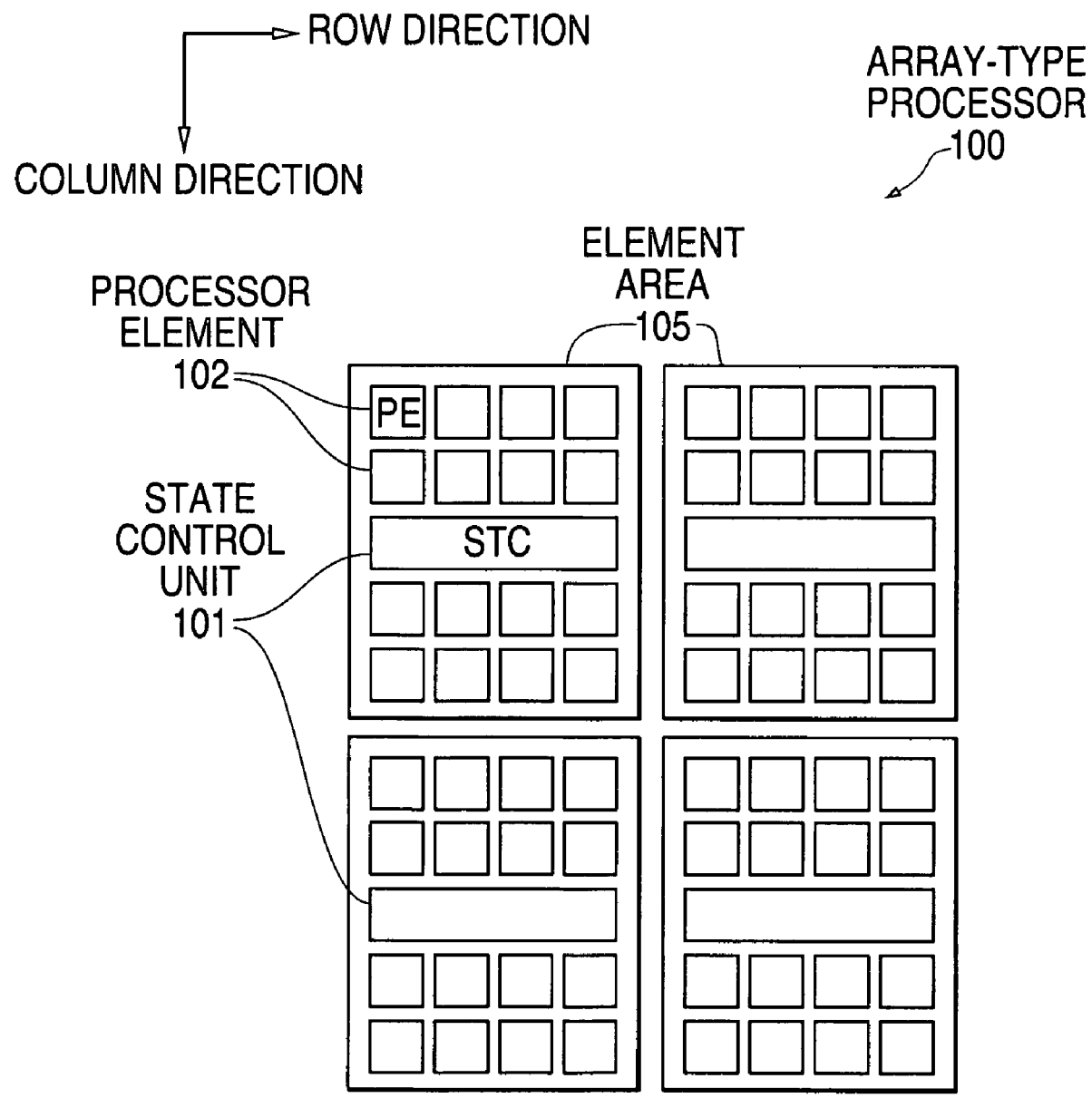

ARRAY-TYPE PROCESSOR HAVING STATE CONTROL UNITS CONTROLLING A PLURALITY OF PROCESSOR ELEMENTS ARRANGED IN A MATRIX

BACKGROUND OF THE INVENTION

1. Field of the Invention

The present invention relates to an array-type processor in which a multiplicity of processor elements that each individually executes data processing and for which the connection relations between the processor elements is switch-controlled are arranged in rows and columns and in which the operations of this multiplicity of processor elements are controlled by a state control unit.

2. Description of the Related Art

Products referred to as CPUs (Central Processing Units) and MPUs (Micro Processor Units) are currently in practical use as processor units that can freely execute various types of data processing.

In data processing systems that employ these processor units, various application programs that are described by a plurality of instruction codes and various types of processing data are stored in memory devices, the processor units read these instruction codes and processing data in order from the memory devices and successively execute a plurality of operations.

A single processor unit can therefore execute various types of data processing, but in this data processing, the plurality of operations must be successively executed in order and the processor unit must read the instruction codes from the memory device for each successive process, and it is therefore difficult to execute complex data processing at high speed.

On the other hand, when the data processing that is to be executed is limited to a single type, constructing logic circuits to execute this data processing by hardware eliminates the need for a processor unit to read a plurality of instruction codes from memory devices in order and then successively execute the plurality of operations in order. Thus, although complex data processing can be executed at high speed, obviously, only a single type of data processing can be executed.

In other words, a data processing system that allows free switching of application programs enables the execution of various types of data processing, but the execution of high-speed data processing is problematic because the configuration of the hardware is fixed. On the other hand, logic circuits that are constituted by hardware enable high-speed execution of data processing but can execute only one type of data processing because they do not permit modification of the application program.

With the aim of solving this problem, the present applicant has invented and submitted an application for an array-type processor as a data processing device in which the hardware configuration changes in accordance with software (please refer to Japanese Patent Laid-Open Publication No. 2001-312481).

In this array-type processor, a multiplicity of small-scale processor elements are arranged in rows and columns together with a multiplicity of switch elements in a datapath unit, one state control unit being provided together with one of these data path units. The multiplicity of processor elements each individually execute data processing in accordance with instruction codes in which data are individually set, and switching of connection relations is controlled by a multiplicity of switch elements that are individually provided together with the processor elements.

The array-type processor can therefore execute various types of data processing in accordance with software because the configuration of the data paths is changed by switching the instruction codes of the multiplicity of processor elements and the multiplicity of switch elements, and can execute data processing at high speed because, as hardware, a multiplicity of small-scale processor elements simultaneously execute simple data processing.

The array-type processor can continuously execute simultaneous processing in accordance with a computer program because the context of the datapath unit, which is made up of the instruction codes of the above-described multiplicity of processor elements and multiplicity of switch elements, is successively switched by a state control unit for each operation cycle in accordance with the computer program.

Although the above-described array-type processor can execute high-speed data processing by means of a multiplicity of processor elements, the state transitions of this multiplicity of processor elements is managed by a single state control unit. As a consequence, executing, for example, two loop transitions, one of four states and the other of six states, together as shown in FIG. 1 calls for a minimum of 12 states, 12 being the smallest common multiple of 4 and 6.

When the number of combined state transitions or the number of states of each transition increases in this way, the number of states expands greatly and interferes with the operating efficiency of the array-type processor. In particular, when condition branches exist in the state transitions, the number of states that are to be managed expands greatly and control in the state control unit becomes problematic.

SUMMARY OF THE INVENTION

The present invention was realized in view of the above-described problems and has as an object the provision of an array-type processor that can operate effectively even when simultaneously executing a plurality of state transitions.

In the array-type processor of the present invention, a multiplicity of processor elements, which individually execute data processing in accordance with instruction codes in which data are individually set and for which the connection relations between the processor elements are switch-controlled, are arranged in rows and columns, and the instruction codes of this multiplicity of processor elements are successively switched by a state control unit.

BACKGROUND OF THE INVENTION

Here, the state control unit is composed of a plurality of units that intercommunicate to realize linked operation, and the multiplicity of processor elements is divided into a number of element areas that corresponds to the number of state control units. The plurality of state control units is connected to processor elements according to the plurality of element areas, each of the plurality of state control units being arranged in a respective element area of the plurality of element areas.

As a result, the plurality of state control units can independent control a plurality of small-scale state transitions, or the plurality of state control units can cooperate to control a single large-scale state transition. Further, the state control units are connected to the plurality of processor elements in groups of each of the plurality of element areas, and the plurality of state control units are each directly connected to the processor elements for which they control states by the shortest possible distance. This construction enables a simplification of the wiring configuration of the array-type processor as well as an improvement in the productivity and operating speed of the array-type processor.

Still further, in the above-described array-type processor, buffer regions can be formed between adjacent element areas, transfer moderation circuits for moderating the data transfer of the processor elements of the element areas on both sides of the buffer regions can be arranged in the buffer regions, and common resources that are shared by the processor elements of element areas on both sides of the buffer regions can be arranged in the buffer regions.

The resulting moderation of data transfer of processor elements of element areas on both sides of a buffer region that is realized by the transfer moderation circuits allows the execution of data transfer without obstacles even when, for example, the processor elements of element areas on both sides of a buffer region operate at different clock cycles.

In addition, the sharing of common resources by processor elements of element areas on both sides of a buffer region enables, for example, hardware that is not provided for each and every one of the plurality of element areas to be used as a common resource by processor elements of element areas on both sides.

In the present invention, 'plurality' means any integer equal to or greater than 2, and 'multiplicity' means any integer that is greater than the above-described 'plurality'.

The above and other objects, features, and advantages of the present invention will become apparent from the following description with reference to the accompanying drawings, which illustrate examples of the present invention.

BRIEF DESCRIPTION OF THE DRAWINGS

FIG. 1 is a schematic view showing the state in which two state transitions are integrated as one;

FIG. 2 is a schematic block diagram showing the array-type processor of the first embodiment of the present invention;

DETAILED DESCRIPTION OF THE PREFERRED EMBODIMENTS

Construction of the First Embodiment

Figure 3A:
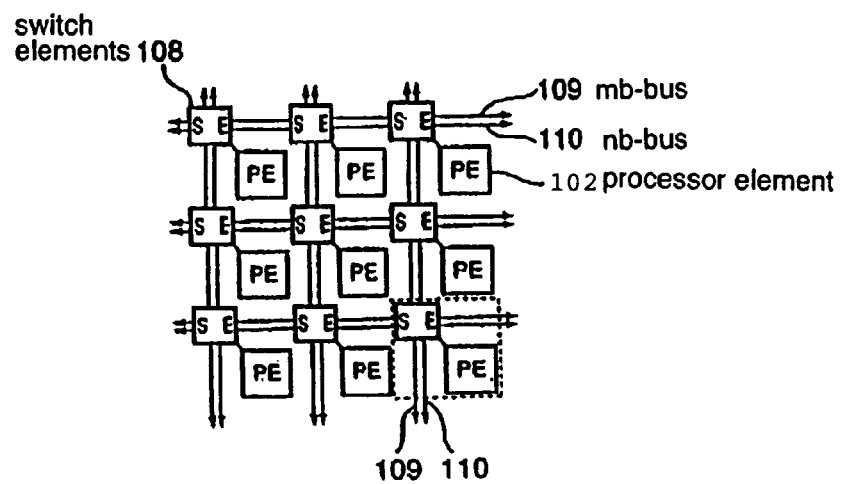
FIGS. 3A and 3B are block diagrams showing the physical configuration of the m/nb-buses of an array-type processor.

The first embodiment of the present invention is next described with reference to FIGS. 2 to 4. First, as shown in FIG. 4, array-type processor 100 of the first embodiment includes as its principal constituent elements state control unit 101, processor elements 102 memory controller 103, and read multiplexer 104.

As shown in FIG. 2, in array-type processor of the present embodiment, state control unit 101 is made up by a plurality of units that communicate with each other to thus realize linked operation; and the multiplicity of processor elements 102 is divided into a number of element areas 105 that corresponds to the number of state control units 101.

The plurality of state control units 101 is connected to processor elements 102 by groups according to the plurality of element areas, each of the plurality of state control units 101 being arranged in a respective element area 105 of processor elements 102 to which that state control unit 101 is connected.

To explain in greater detail, the plurality of processor elements 102 are arranged in matrix form for each of the plurality of element areas 105, and the plurality of element areas 105 that have been partitioned in rectangular form are also arranged in matrix form. State control units 101 are formed in a shape that is equivalent to a row of processor elements 102 in each of element areas 105, and state control units 101 are each arranged in substantially the center in the columnar direction of a respective element area 105.

In the interest of simplifying the explanation below, four element areas 105-1-105-4 in array-type processor 100 of the present embodiment are arranged in two rows and two columns as shown in the figures, and 16 processor elements 102 are arranged in four rows and four columns in each of element areas 105.

Further, the right-left direction in FIG. 2 is assumed to be the row direction, and the vertical direction is assumed to be the column direction, the rows are each arranged in the direction of columns, and the columns are each arranged in the direction of rows. Thus, state control units 101 are each formed in a shape that is equivalent to one row of four processor elements 102 of each of element areas 105 and are arranged between the second and third rows of processor elements 102 of each of element areas 105.

Memory controller 103 transfers various types of data that are received as input from the outside to processor elements 102 and to state control units 101 of element areas 105, and read multiplexer 104 supplies various type of data from processor elements 102 as output to the outside.

Processor elements 102 perform data processing using various types of data that have been received as input from memory controller 103, and supplies the various types of data that have undergone data processing as output to read multiplexer 104. State control units 101 control the state transitions of processor elements 102 of element areas 105 to cause processor elements 102 of element areas 105 to execute various types of data processing.

Figure 3B:
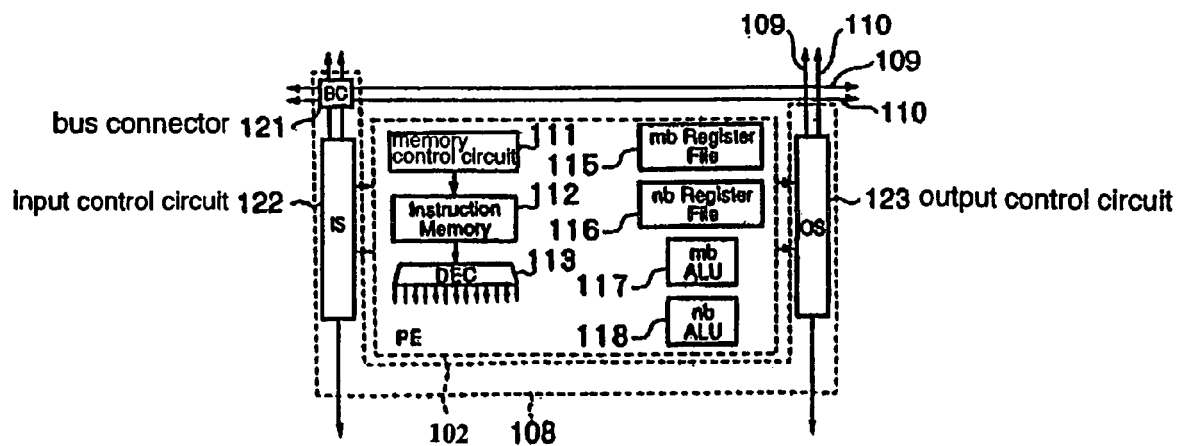
Figure 4:
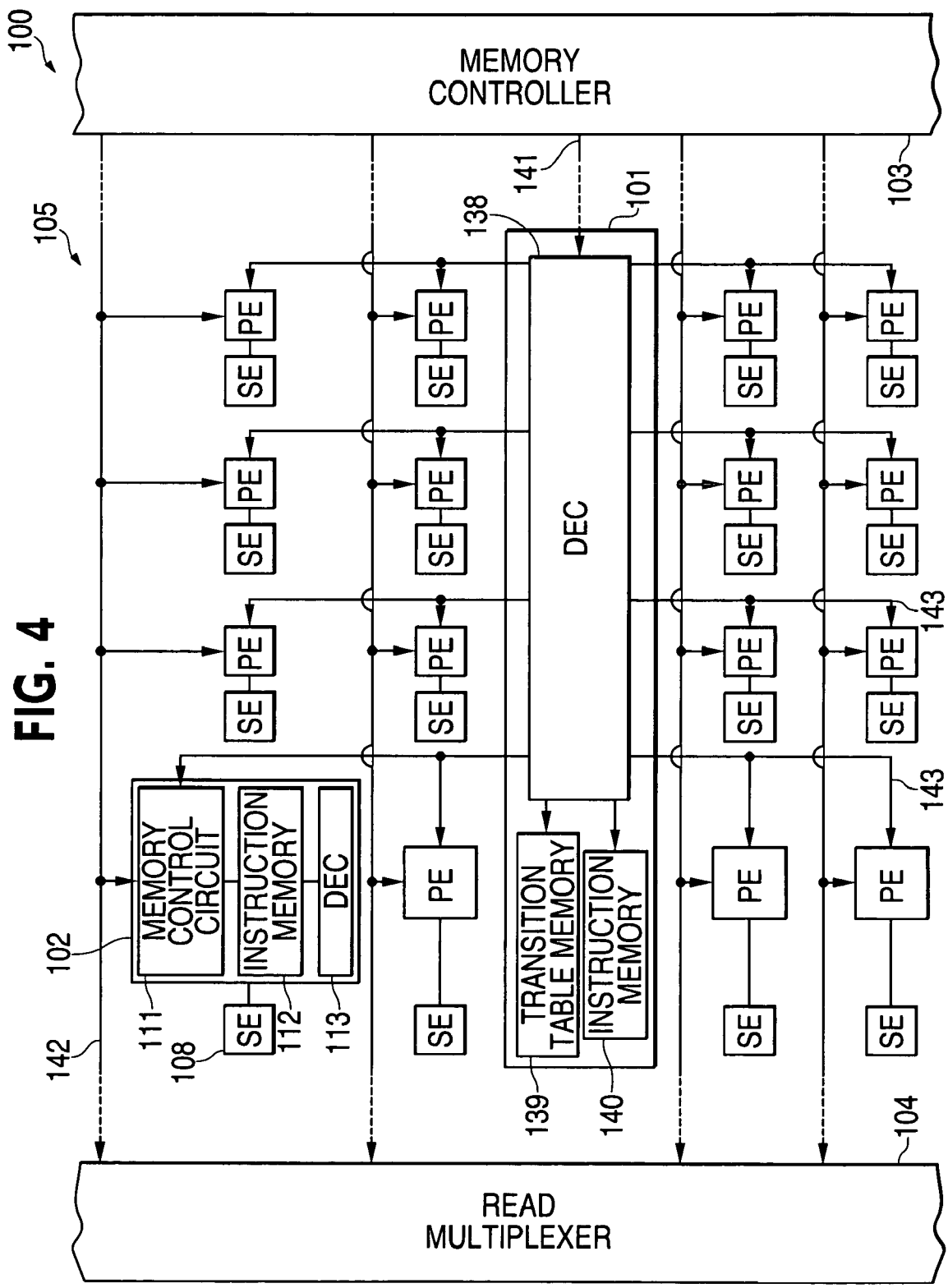
FIG. 4 is a block diagram showing the physical construction of the instruction buses.

To describe in greater detail, a multiplicity of switch elements 108 are arranged in rows and columns together with the multiplicity of processor elements 102 in element areas 105, as shown in FIGS. 3 and 4; and the multiplicity of processor elements 102 are connected as a matrix by a multiplicity of mb (m-bit) buses 109 and a multiplicity of nb (n-bit) buses 110 by way of these switch elements 108.

Further, as shown in FIG. 3B, processor elements 102 each include: memory control circuit 111, instruction memory 112, instruction decoder 113, mb-register file 115, nb-register file 116, mb-ALU (Arithmetic and Logical Unit) 117, nb-ALU 118, internal variable lines (not shown in the figures); and switch elements 108 each include; bus connector 121, input control circuit 122, and output control circuit 123.

In addition, the plurality of state control units 101 each include: instruction decoder 138, transition table memory 139, and instruction memory 140, as shown in FIG. 4; instruction decoder 138 and memory controller 103 being connected by instruction bus 141.

Eight rows of instruction buses 142 are connected in parallel from memory controller 103 to read multiplexer 104, and these eight rows of instruction buses 142 are connected to memory control circuits 111 of the eight columns of processor elements 102 for each row.

Two sets of four columns of address buses 143 are connected to one instruction decoder 138 of state control unit 101, each column of these address buses 143 being connected to memory control circuits 111 of two rows of processor elements 102.

Instruction bus 141 is formed with a bus width of, for example, 20 bits, and instruction buses 142 and address buses 143 are formed with a bus width of, for example, 8 bits. Memory controller 103 is connected to the four state control units 101 by instruction bus 141, and the four state control units 101 are connected by a dedicated communication line (not shown in the figure) to allow intercommunication.

In array-type processor 100 of the present embodiment, state control units 101 are connected to processor elements 102 in groups of each element area 105 as described hereinabove, and these state control units 101 therefore exercise control over the states of only those processor elements 102 to which they are connected.

In array-type processor 100 of the present embodiment, moreover, instruction codes for the multiplicity of processor elements 102 and the multiplicity of switch elements 108 of element areas 105 are established in data as contexts that successively switch in a computer program that is supplied from the outside, and the instruction codes of state control units 101 that switch these contexts for each operation cycle are set in data as operation states that undergo successive transitions.

As a result, each of state control units 101 stores the above-described instruction codes pertaining to that unit as data in instruction memory 140, as shown in FIG. 4, and transition rules for causing successive transitions of a plurality of operating states are stored as data in transition table memory 139.

State control units 101 cause successive transitions of operating states in accordance with the transition rules of transition table memory 139 and, using the instruction codes of instruction memory 140, generate instruction pointers of processor elements 102 and switch elements 108.

As shown in FIG. 3B, switch element 108 shares instruction memory 112 of adjacent processor element 102, and state control unit 101 therefore supplies generated instruction pointers of processor element 102 and switch element 108 to instruction memory 112 of the corresponding processor element 102.

The plurality of instruction codes of processor element 102 and switch element 108 is stored as data in this instruction memory 112, and the instruction codes of processor element 102 and switch element 108 are designated by a single instruction pointer supplied from state control unit 101. Instruction decoder 113 decodes the instruction codes that have been designated by instruction pointers and controls the operation of switch element 108, internal variable lines, and m/nb-ALUs 117 and 118.

Mb-buses 109 transfer the m bits, i.e., '8 bits', of processing data and nb-buses 110 transfer n bits, i.e., '1 bit' of processing data, whereby switch element 108 controls the connection relations of the multiplicity of processor elements 102 by means of m/nb buses 109 and 110 in accordance with the operation control of instruction decoder 113.

To state in greater detail, bus connector 121 of switch element 108 links mb-buses 109 and nb-buses 110 in four directions and controls the connection relations between the plurality of mb-buses 109 that are thus linked and the connection relations between the linked plurality of nb-buses 110 that are linked.

Thus, in array-type processor 100, state control units 101 for each of a plurality of element areas 105 successively switch the contexts of processor elements 102 for each operation cycle in accordance with a computer program that is supplied from the outside, and the multiplicity of processor elements 102 perform simultaneous operations by data processing that can be freely and individually set for each stage.

As shown in FIG. 3B, input control circuit 122 controls the connection relations of data input from mb-buses 109 to mb-register file 115 and mb-ALU 117, and the connection relations of data input from nb-buses 110 to nb-register file 116 and nb-ALU 118.

Output control circuit 123 controls the connection relations of data output from mb-register file 115 and mb-ALU 117 to mb-buses 109, and the connection relations of data output from nb-register files 116 and nb-ALU 118 to nb-buses 110.

Under the operation control of instruction decoder 113, the internal variable lines of processor elements 102 control the connection relations of mb-register file 115 and mb-ALU 117 and the connection relations of nb-register file 116 and nb-ALU 118 inside processor elements 102.

In accordance with the connection relations that are controlled by the internal variable lines, mb-register file 115 temporarily holds the m-bits of processing data that are supplied as input from, for example, mb-buses 109 and supplies the processing data as output to, for example, mb-ALU 117. In accordance with the connection relations that are controlled by the internal variable lines, nb-register file 116 temporarily holds the n bits of processing data that are supplied as input from, for example nb-buses 110 and supplies [the processing data] as output to, for example, nb-ALU 118.

In accordance with operation control of instruction decoder 113, mb-ALU 117 executes data processing using the m-bits of processing data; and in accordance with the operation control of instruction decoder 113, nb-ALU 118 executes data processing using the n bits of processing data, whereby appropriate data processing of m/n bits is executed in accordance with the number of bits of processing data.

The processing results obtained by processor elements 102 for each of element areas 105 are fed back to state control units 101 as event data as necessary, whereby these state control units 101, by means of the event data that are received as input, both cause transitions of the operation state to the next operation state and switch the contexts of processor elements 102 to the next context.

Operation of the First Embodiment

In the construction as described in the preceding explanation, when data processing is executed in array-type processor 100 of the present embodiment using processing data that are supplied as input from the outside in accordance with a computer program that is supplied from the outside, state control units 101 for each of the plurality of element areas 105 both cause successive transitions of the operating states and successively switch the contexts of processor elements 102 for each operation cycle.

The multiplicity of processor elements 102 thus operate simultaneously on data processing that can be freely and individually set for each of these operation cycles, and the connection relations of this multiplicity of processor elements 102 are switch-controlled by the multiplicity of switch elements 108. At this time, the processing results of processor elements 102 are fed back as event data to state control units 101 for each of element areas 105 as necessary, these state control units 101 use the event data that have been received as input to both cause transitions of the operating states to the operating states of the next stage and switch the contexts of processor elements 102 to the contexts of the next stage.

Data processing is executed in array-type processor 100 of the present embodiment by state transitions of the contexts of processor elements 102 that are brought about by state control units 101 as described in the foregoing explanation, but the states of the plurality of processor elements 102 that are connected to state control units 101 for each of the four element areas 105-1-105-4 are each individually controlled, and the four state control units 101-1-101-4 intercommunicate to realize linked operation.

As a result, a single state transition of data processing can be executed by all processor elements 102 of the four element areas 105-1-105-4, or alternatively, for example, four state transitions can be individually executed in the four element areas 105-1-105-4, or two state transitions can be assigned to specific pairs of the four element areas 105-1-105-4.

For example, in array-type processor 100 of the present embodiment, a pair of element areas 105 that are controlled by state control units 101 is arranged in the columnar direction, and when, for example, processing data are transferred in the row direction, a pair of items of processing data of small volume can be simultaneously processed with high efficiency in the two rows of element areas 105.

Effects of the First Embodiment

In array-type processor 100 of the present embodiment, four rows and four columns of processor elements 102 are arranged in each of four element areas 105-1-105-4 as described in the foregoing explanation, the states of these four element areas 105-1-105-4 are individually controlled by four state control units 101-1-101-4, and these four state control units 101-1-101-4 intercommunicate to realize linked operation.

As a result, the four state control units 101-1-101-4 can cooperate to control a single large-scale state transition, or the four state control units 101-1-101-4 can separately control a plurality of small-scale state transitions. In particular, the four state control units 101-1-01-4 and the four element areas 105-1-105-4 can also operate in complete independence, whereby, for example, the operating clocks of the four state control units 101-1-101-4 and the four element areas 105-1-105-4 can all be caused to differ.

In array-type processor 100 of the present embodiment, moreover, the data processing that is realized by the above-described control of states exercised by state control units 101 over processor elements 102 to which state control units 101 are connected is fundamentally exercised for each of element areas 105, and in these element areas 105, state control units 101 are arranged in the center of processor elements 102 that are arranged in rows and columns.

As a result, in array-type processor 100 of the present embodiment, state control units 101 for each of the plurality of element areas 105-1-105-4 are connected directly to a plurality of processor elements 102 by the shortest possible distance, and this wiring configuration is therefore simple and allows an improvement in productivity and operating speed.

In particular, in array-type processor 100 of the present embodiment, the plurality of processor elements 102 in element areas 105 usually transfer processing data in the row direction, but state control units 101 are each formed in a shape that is equivalent to one row of processor elements 102 in element areas 105, whereby data transfer of processor elements 102 is not impeded by state control units 101 and the overall operating efficiency is improved.

Modifications of the First Embodiment

The present invention is not limited by the above-described embodiment but allows a variety of modifications within the scope of the invention. For example, although the above-described embodiment specifies the number and arrangement of element areas 105 and processor elements 102, these numbers can of course be set to a variety of values.

In the above-described embodiment, state control units 101 are arranged between the second and third rows of processor elements 102 that are arranged in four rows and four columns for each of element areas 105 that are arranged in two rows and two columns, whereby the wiring distances between state control units 101 and processor elements 102 in these element areas 105 can be minimized.

Figure 5:
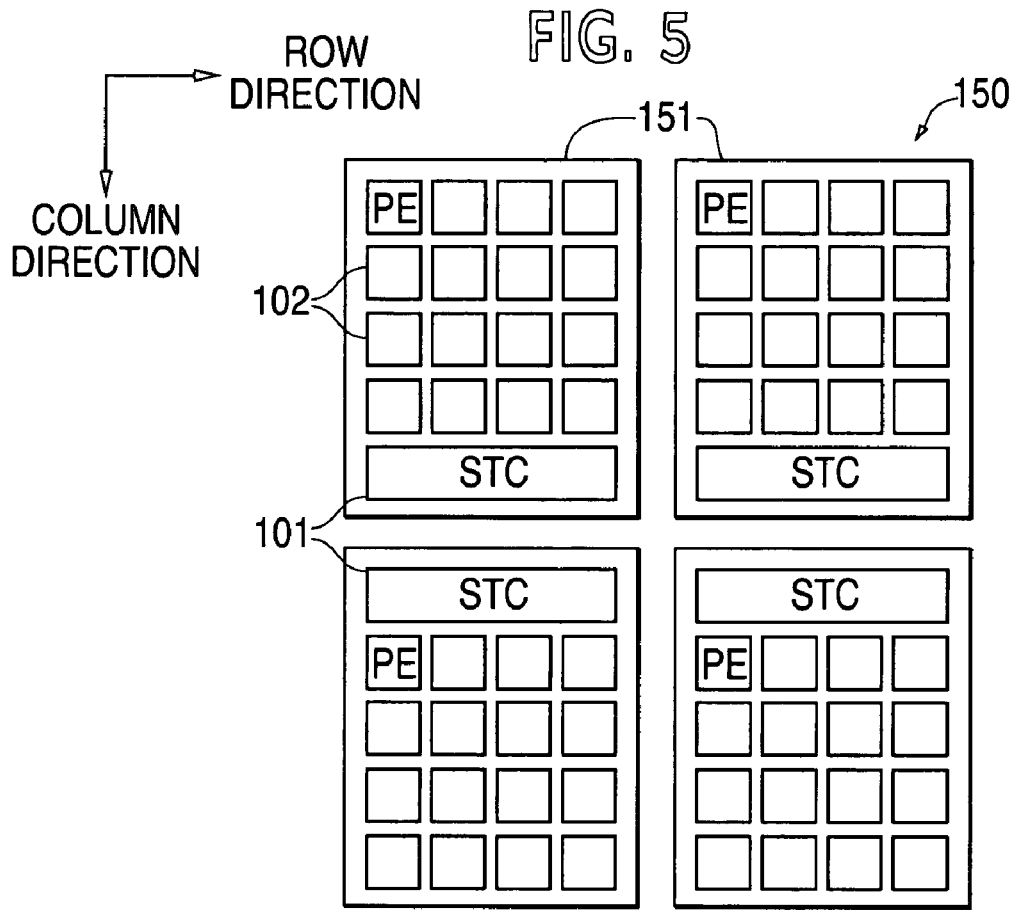
FIG. 5 is a schematic view showing a first modification of the first embodiment.

However, state control units 101 can also be arranged at positions that confront each other in the columnar direction of a plurality of element areas 151 that are arranged in a matrix, as in array-type processor 150 that is shown in FIG. 5. In this array-type processor 150, the average wiring distance between state control units 101 and processor elements 102 in element areas 151 is greater than in the previously described array-type processor 100, but the wiring distance between the plurality of state control units 101 can be reduced.

This configuration can therefore deal with the time required for intercommunication when the plurality of state control units 101 realize linked operation and can thus bring about an improvement in the operating speed of array-type processor 150.

Figure 6:
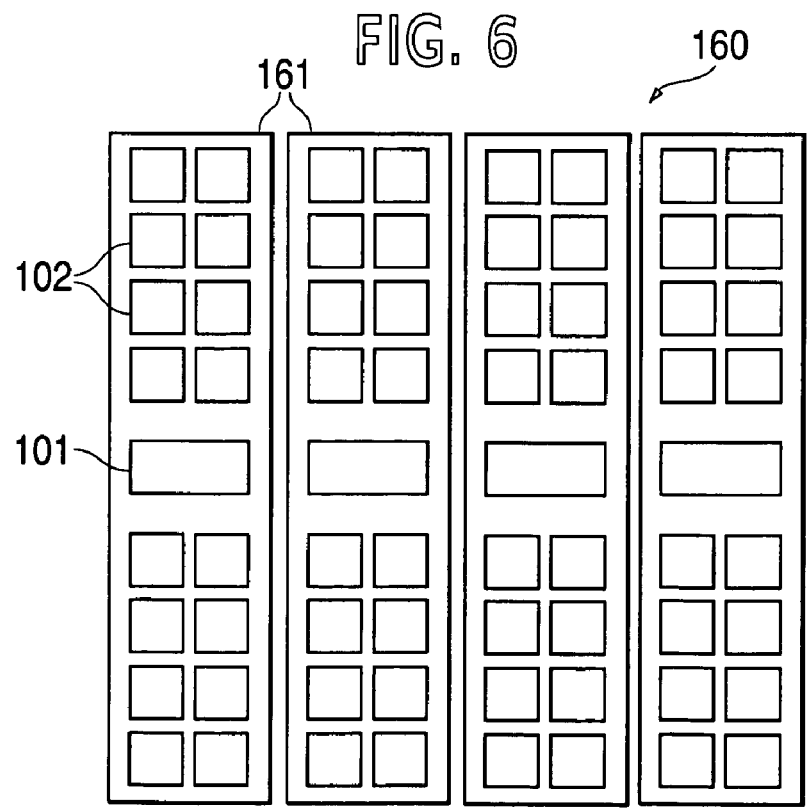
FIG. 6 is a schematic block diagram showing a second modification.

Further, element areas 161 can be formed in a shape that is extended in the column direction with state control units 101 arranged in the center and then arranged in the row direction, as in array-type processor 160 that is shown in FIG. 6. In this array-type processor 160 as well, the average wiring distance between state control units 101 and processor elements 102 in element areas 161 is greater than in the previously described array-type processor 100, but the wiring distance between the plurality of state control units 101 can be reduced.

In this array-type processor 160, only one element area 161 exists in the columnar direction, and processor elements 102 in this element area 161 are numerous in the column direction and limited in number in the row direction. As a result, when processing data are transferred in the row direction, for example, a large volume of processing data can undergo data processing at high efficiency in a combination of processing units having few steps.

Figure 7:
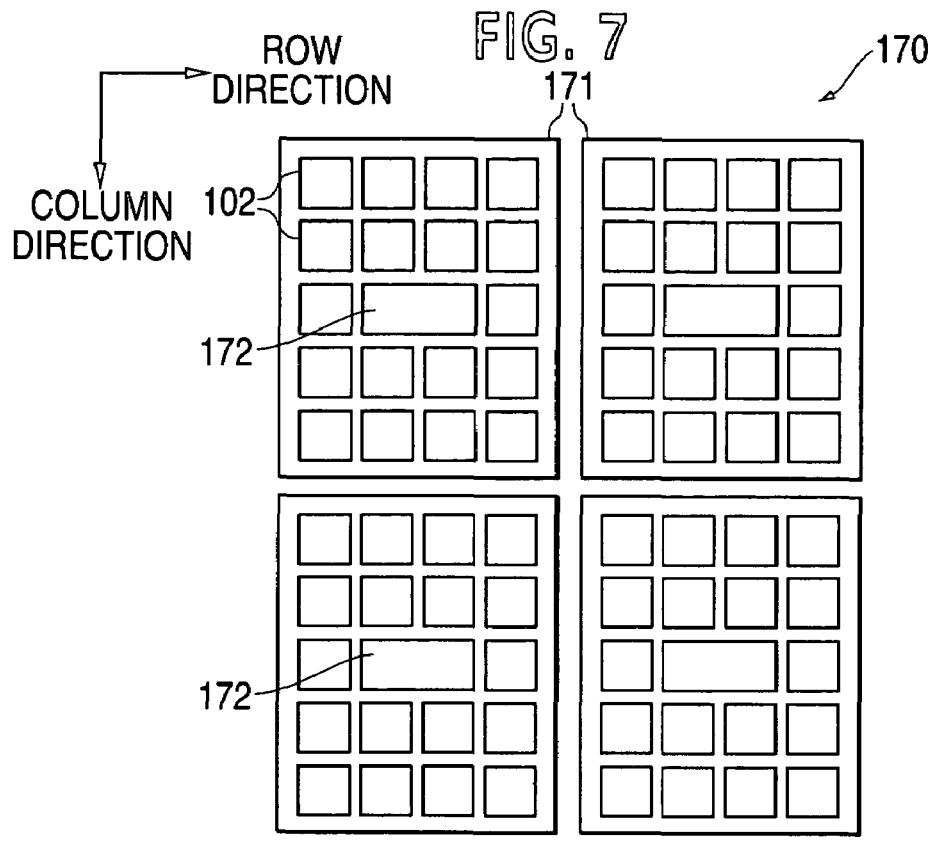
FIG. 7 is a schematic block diagram showing a third modification.

Further, although state control units 101 in the above-described embodiment are each formed in the same shape as one row of processor elements 102 that are arranged in element areas 105, these state control units 101 can also be formed in the same shape as two rows or three rows, or, as in array-type processor 170 that is shown in FIG. 7, state control units 172 can each be formed in the same shape as an arrangement of a number of processor elements 102 in a row of processor elements 102 that are arranged in element areas 171.

In this array-type processor 170, processor elements 102 that are positioned on both sides of state control units 172 in the row direction cannot easily contribute to data processing of the overall device, but can execute processes such as temporarily holding processing data of surrounding processor elements 102.

Further, in array-type processor 100 of the above-described embodiment, a case was described in which the plurality of state control units 101 simply communicate with each other on the same level to realize linked operation, but one of the plurality of state control units 101 can be set as a higher-order master and the other state control units 101 can be set as lower-order slaves, or a master circuit (not shown in the figure) can be specially established that is of a higher rank than the plurality of state control units 101.

In array-type processor 100 of the above-described embodiment, a case was described in which processor elements 102 that each include m/nb-register files 115 and 116 or m/nb-ALUs 117 and 118 are connected by m/nb-buses 109 and 110 and in which data processing and data communication was executed by m bits and n bits.

However, data processing and data communication at three or more bit numbers can also be executed using hardware of three or more bit numbers, or data processing and data communication at a single number of bits can be executed by hardware of a single number of bits.

In array-type processor 100 of the above-described embodiment, a case was described in which the plurality of state control units 101 intercommunicate on a dedicated communication line in order to realize linked operation, but this intercommunication can also be realized by, for example, m/nb-buses 109 and 110 of element areas 105 and the communication line can thus be omitted.

In array-type processor 100 of the above-described embodiment, a case was described in which adjacent processor elements 102 and switch elements 108 were allowed to share instruction memory 112 and in which the instruction codes of processor elements 102 and switch elements 108 were generated by a single instruction pointer.

However, instruction memories for the specific use of processor elements 102 and switch elements 108 can also be separately provided, and the instruction codes of processor elements 102 and switch elements 108 can each be separately generated by respective dedicated instruction pointers.

In addition, in the interest of simplifying the figures and explanation in the above-described embodiment, a case was described in which one mb-bus 109 and one nb-bus 110 for each of the row and column directions was connected to each processor element 102, but in actuality, several mb-buses 109 and several nb-buses 110 are ideally connected to each individual processor element 102.

Finally, although a case was described in the above-described embodiment in which the plurality of state control units 101 communicated with each other to realize linked operation, the plurality of state control units 101 can also individually execute a plurality of data processing in the plurality of element areas 105 without realizing linked operation. In such a case, a plurality of independent data processing can be executed simultaneously, and, for example, a series of data processing can be divided into a plurality of steps and executed in stages in a plurality of element groups 145.

Construction of the Second Embodiment

Figure 8:
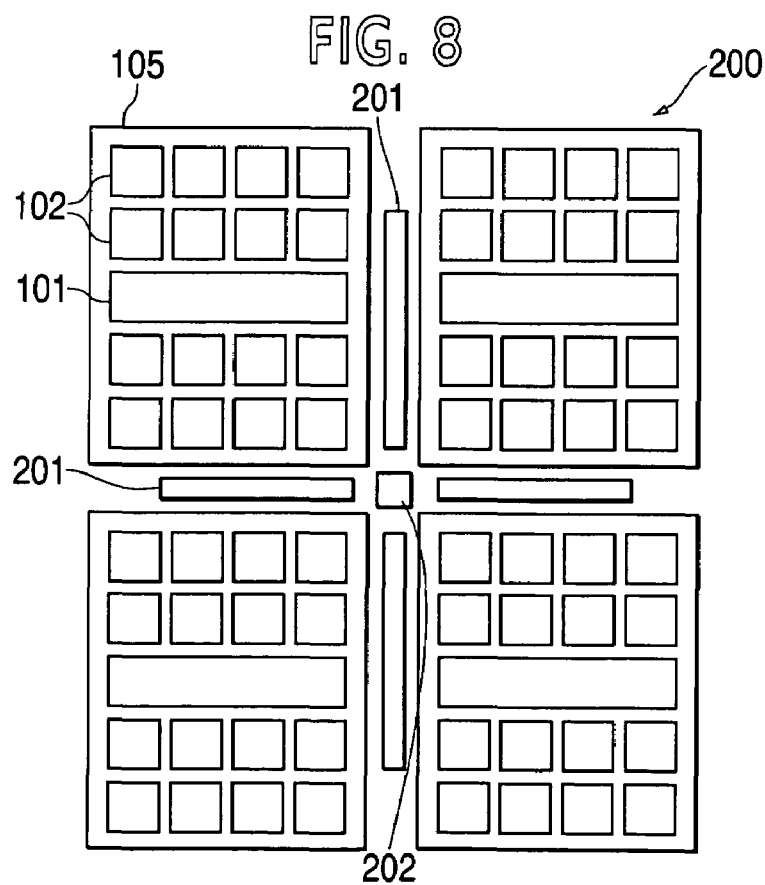
FIG. 8 is a schematic block diagram showing the array-type processor of the second embodiment.
Figure 9:
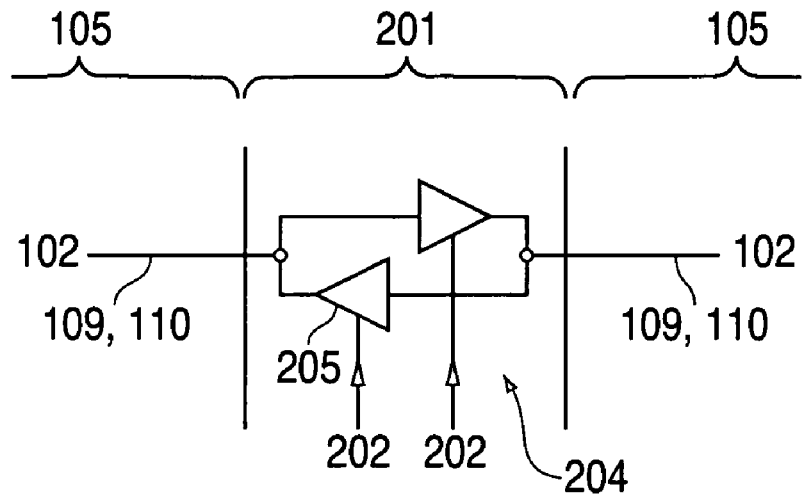
FIG. 9 is a circuit diagram showing a transfer moderation circuit.

Explanation next regards the second embodiment of the present invention with reference to FIGS. 8 and 9. In the explanation of this and succeeding embodiments, parts that are identical to parts in preceding embodiments are identified using the same names and same reference numerals and redundant detailed explanation are omitted.

In array-type processor 200 of the present embodiment, as shown in FIG. 8, buffer regions 201 are formed between adjacent element areas 105 and central control unit 202 is formed in the center of this plurality of buffer regions 201. Further, as shown in FIG. 9, transfer moderation circuits 204 are arranged in buffer regions 201 for moderating the transfer of data of processor elements 102 of element areas 105 on both sides, and these transfer moderation circuits 204 are composed of a pair of tristate buffer circuits 205 that are arranged in parallel and that have reciprocal directions of transferring processing data.

To state in more detail, in array-type processor 200 of the present embodiment, processor elements 102 are connected in a matrix by mb-buses 109 and nb-buses 110 as previously described, and the above-described transfer moderation circuits 204 are formed for each row and each column of mb-buses 109 and nb-buses 110.

Central control unit 202 is then connected to the plurality of state control units 101 and the multiplicity of transfer moderation circuits 204, and intercommunicates with the plurality of state control units 101 to realize linked operations. Central control unit 202 selectively turns ON and OFF the pair of buffer circuits 205 of transfer moderation circuits 204 for each of buffer regions 201 to control the connection relations of adjacent element areas 105.

Operation of the Second Embodiment

In array-type processor 200 of the present embodiment in the above-described construction, central control unit 202 that intercommunicates with the plurality of state control units 101 controls the connection relations of the plurality of element areas 105 by means of buffer regions 201. This control by means of buffer regions 201 allows free switching of both the OFF state of the connection between adjacent element areas 105 and the setting of the direction of transfer of processing data in adjacent element areas 105.

Thus, for example, a plurality of element areas 105 in which the connection relations have been turned OFF at buffer regions 201 can be allowed to operate at different clock cycles, and processing data can be transferred from one element area 105 to another element area 105 as necessary at buffer regions 201.

Effect of the Second Embodiment

In array-type processor 200 of the present embodiment, the control of the connection relations of the plurality of element areas 105 by means of buffer regions 201 as described above allows the plurality of element areas 105 to be operated at different clock cycles and allows processing data to be freely conferred to the plurality of element areas 105.

In particular, in array-type processor 200 of the present embodiment, the operation of the four buffer regions 201 that are located between the two rows and two columns of element areas 105 is controlled by one central control unit 202 that intercommunicates with the four state control units 101, whereby the connection relations of element areas 105 can be simply and precisely controlled.

Moreover, transfer moderation circuits 204 of buffer regions 201 each include a pair of buffer circuits 205 having reciprocal transfer directions, whereby the connection relations of processor elements 102 of adjacent element areas 105 can be precisely controlled by means of a simple construction. Further, buffer circuits 205 can amplify transfer data and thus can prevent errors when transmitting processing data over long distances.

Modifications of the Second Embodiment

The present invention is not limited to the above-described embodiments and allows various modifications within the scope of the invention. For example, a case was described in the above-described embodiment in which central control unit 202 exercised uniform control over the operations of a plurality of transfer moderation circuits 204 that are positioned in buffer regions 201 to turn ON and OFF the connection relations of adjacent element areas 105 by means of a simple construction.

Figure 10:
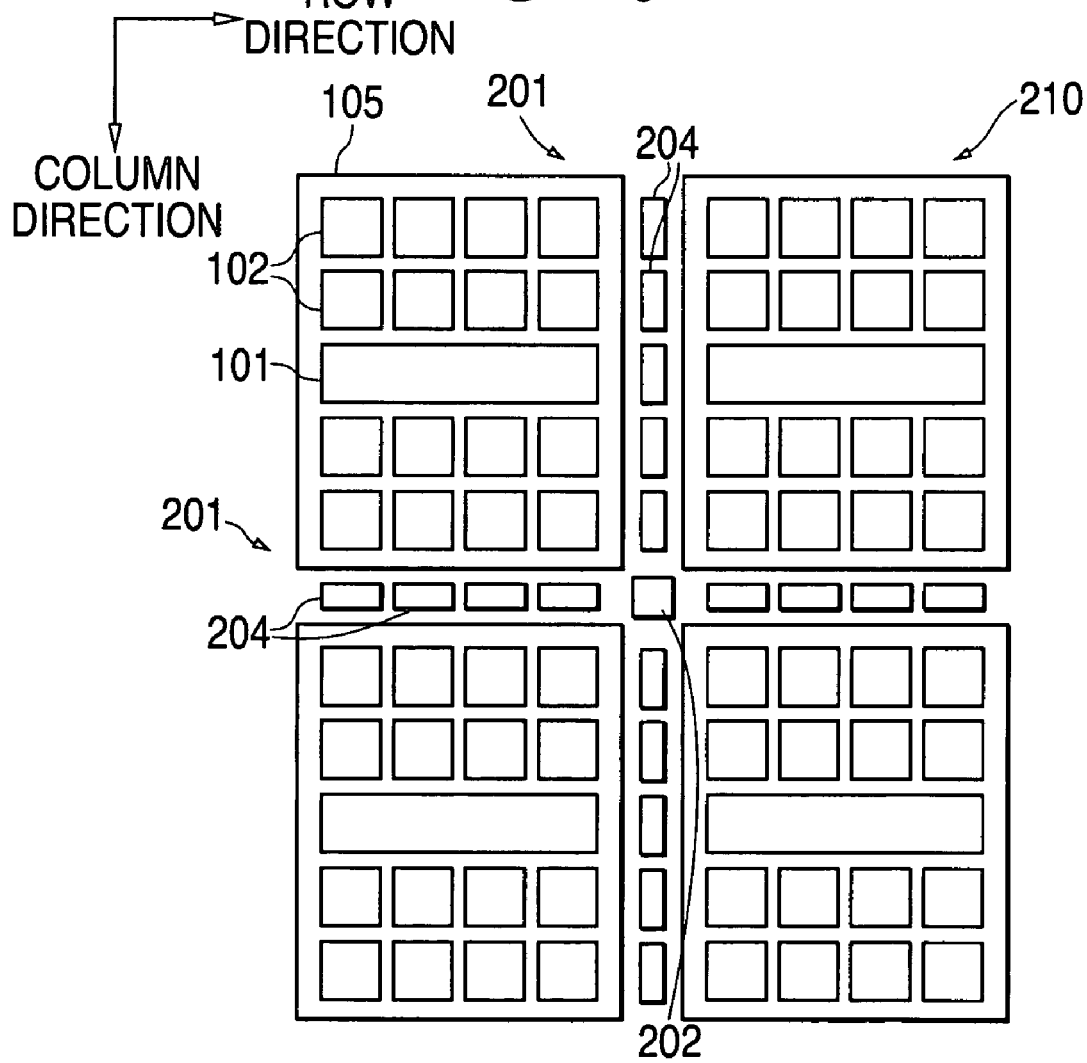
FIG. 10 is a schematic block diagram showing a first modification of the second embodiment.

However, as in array-type processor 210 that is shown in FIG. 10, central control unit 202 can also exercise individual control over the operations of each of the plurality of transfer moderation circuits 204 that are positioned in buffer regions 201, whereby the connection relations of adjacent element areas 105 can be controlled for each processor element 102.

In addition, it was assumed in above-described array-type processor 200 that all processor elements 102 in adjacent element areas 105 are connected by m/nb-buses 109 and 110 and that transfer moderation circuits 204 are inserted in all of these m/nb-buses 109 and 110.

However, it is also possible to insert transfer moderation circuits 204 in only a portion of m/nb-buses 109 and 110 that connect processor elements 102 of adjacent element areas 105 and to directly connect the other portions; and it is possible to connect only a portion of processor elements 102 in adjacent element areas 105 by means of m/nb-buses 109 and 110 and to disconnect the remaining portion.

Further, it is possible to connect processor elements 102 by a plurality of m/nb-buses 109 and 110 (not shown in the figure), and then to insert transfer moderation circuits 204 in only a portion of the plurality of m/nb-buses 109 and 110 that connect processor elements 102 of adjacent element areas 105 and directly connect the other processor elements 102, or to disconnect only a portion of processor elements 102. Alternatively, it is possible to insert transfer moderation circuits 204 in only one of m/nb-buses 109 and 110 that connect processor elements 102 of adjacent element areas 105 and to directly connect the other processor elements 102, or to disconnect only one of m/nb-buses 109 and 110.

Further, it is possible to connect processor elements 102 by means of a plurality of signal lines (not shown in the figure) apart from m/nb-buses 109 and 110, to insert transfer moderation circuits 204 in only a portion of the plurality of signal lines that connect processor elements 102 of adjacent element areas 105 and directly connect the other processor elements 102, or to disconnect only a portion of processor elements 102.

A construction in which only a portion of processor elements 102 of adjacent element areas 105 are connected by m/nb buses 109 and 110 or signals lines can be used in high-speed long-distance data communication, but an amplifier (not shown in the figure) should be inserted if the voltage drop of the communication data becomes problematic.

Although a case was described in the above-described embodiment in which buffer regions 201 are arranged in the spaces between element areas 105, it is also possible to, for example, arrange buffer regions 201 in the spaces between element areas 105 and memory controller 103 or in the spaces between element areas 105 and read multiplexer 104.

Figure 11:
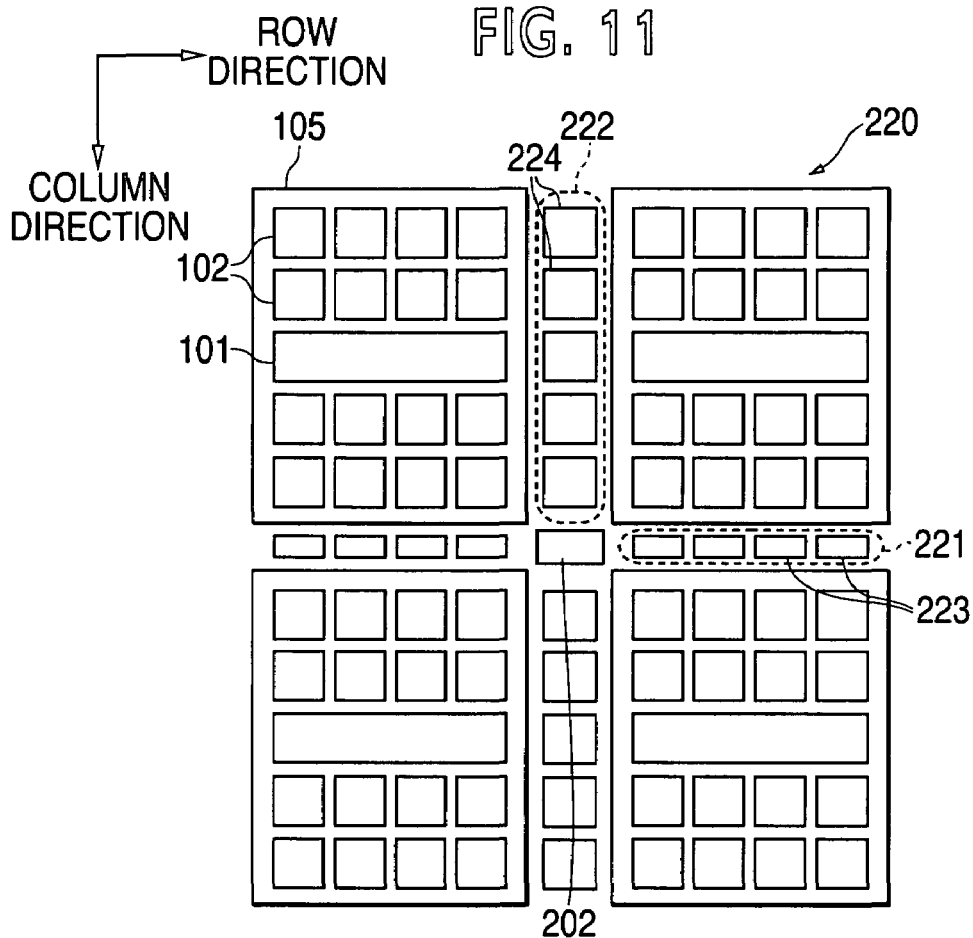
FIG. 11 is a schematic block diagram showing a second modification.

Although it is assumed in the above-described embodiment that transfer moderation circuits 204 of buffer regions 201 that are positioned between element areas 105 that are adjacent in the row direction and transfer moderation circuits 204 of buffer regions 201 that are positioned between element areas 105 that are adjacent in the column direction have the same construction and functions, it is also possible for transfer moderation circuits 223 and 224 in buffer regions 221 and 222 to have different constructions and functions, as in array-type processor 220 that is shown in FIG. 11.

Array-type processor 220 is anisotropic in the row and column directions because, as described hereinabove, the transfer direction of processing data is all in the row direction. As a result, buffer regions 221 and 222 as described hereinabove can be formed as a dedicated construction that is specialized for demanded functions to enable optimization of the construction and functions of array-type processor 220.

Figure 12:
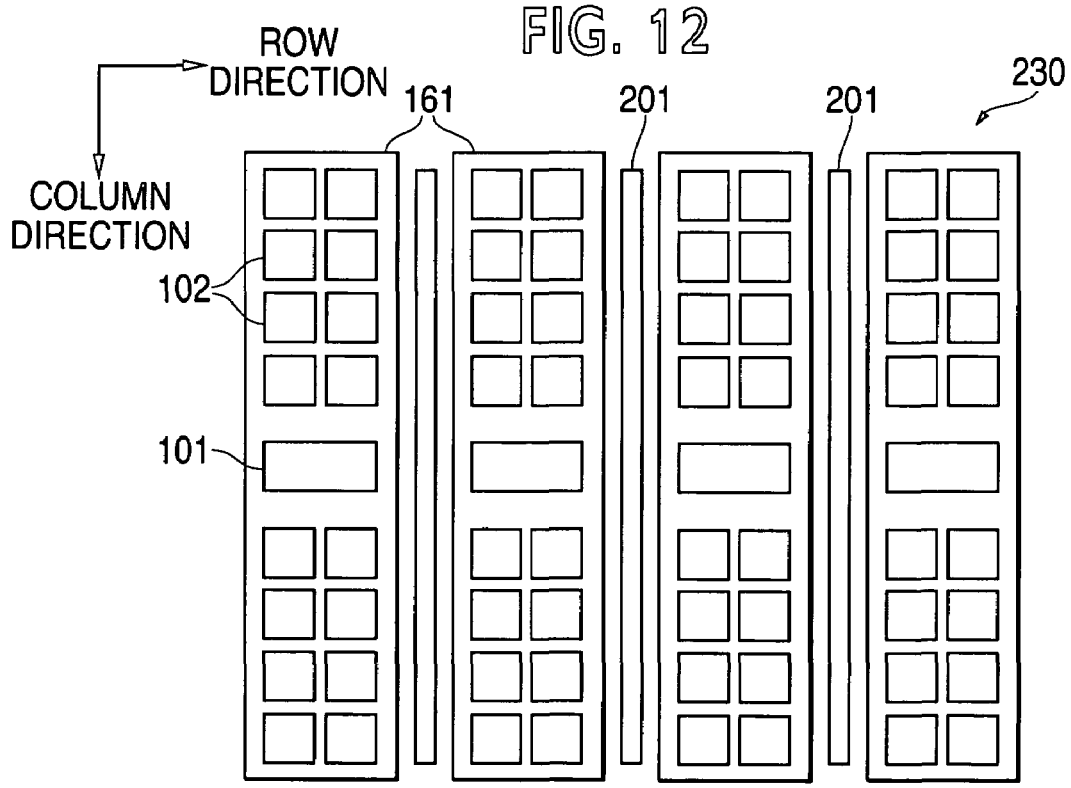
FIG. 12 is a schematic block diagram showing a third modification.

Further, although the above-described embodiment is for array-type processor 200 having a construction in which buffer regions 201 are added to the previously described array-type processor 100, it should be clear that array-type processor 230 is also possible in which buffer regions 201 are added to the previously described array-type processor 160, as shown in FIG. 12.

Figure 13:
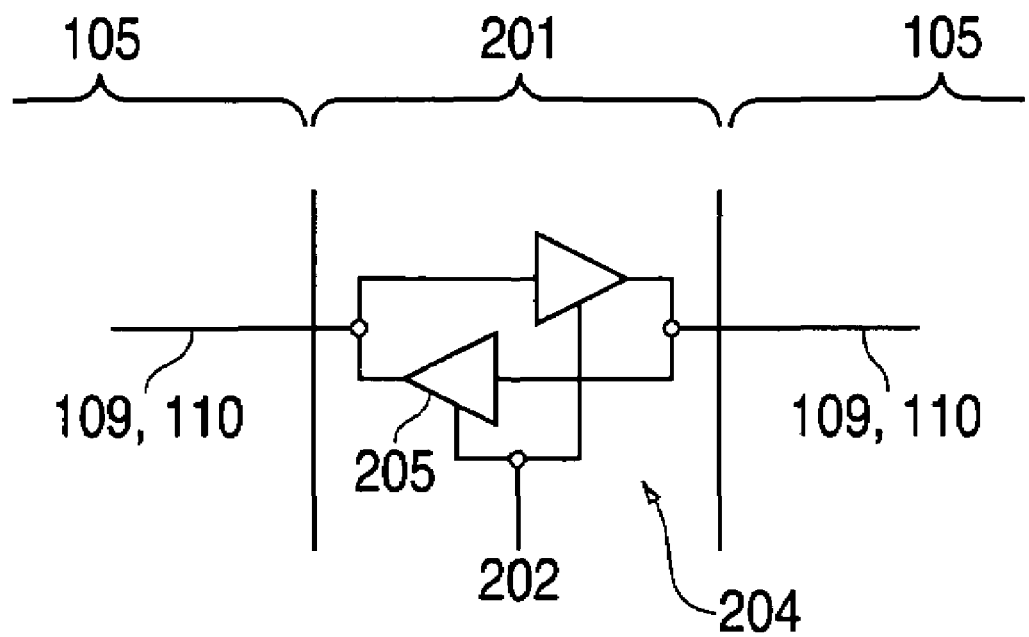
FIG. 13 is a schematic block diagram showing a fourth modification.

A case was described in the above-described embodiment in which individually controlling the operation of the pair of buffer circuits 205 of transfer moderation circuits 204 enables free control of the connection relations of adjacent element areas 105. However, as shown in FIG. 13, it is also possible to have the ON/OFF state of the pair of buffer circuits 205 reciprocate and effect common control by central control unit 202 to switch only the direction of transfer of processing data in adjacent element areas 105.

Figure 14:
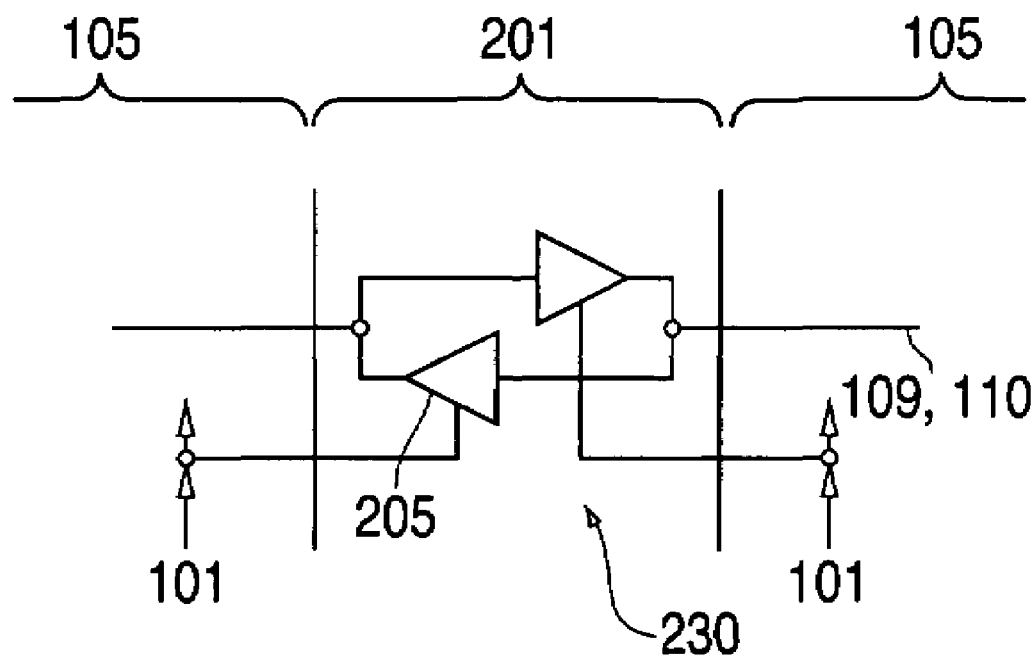
FIG. 14 is a schematic block diagram showing a fifth modification.

Further, a case was described in the above-described embodiment in which central control unit 202 is positioned in the center of a plurality of buffer regions 201 and this central control unit 202 intercommunicates with a plurality of state control units 101 to control the operations of transfer moderation circuits 204 of buffer regions 201. However, it is also possible for state control units 101 of element areas 105 that execute data reception to control the operations of the pair of buffer circuits 205 of [each of] transfer moderation circuits 230, as shown in FIG. 14.

In this case, element areas 105 that receive processing data from other element areas 105 can control by means of state control units 101 whether or not these data can be received, whereby the intercommunication between a plurality of element areas 105 can be precisely moderated by a simple construction that does not require central control unit 202.

Further, a case was described in the above-described embodiment in which central control unit 202 for realizing the integrated control of a plurality of state control units 101 is arranged in dead space that exists at the center of a plurality of buffer regions 201, but it is also possible to form a dedicated buffer region (not shown in the figure) for moderating intercommunication of the plurality of buffer regions 201 at this location.

Figure 15:
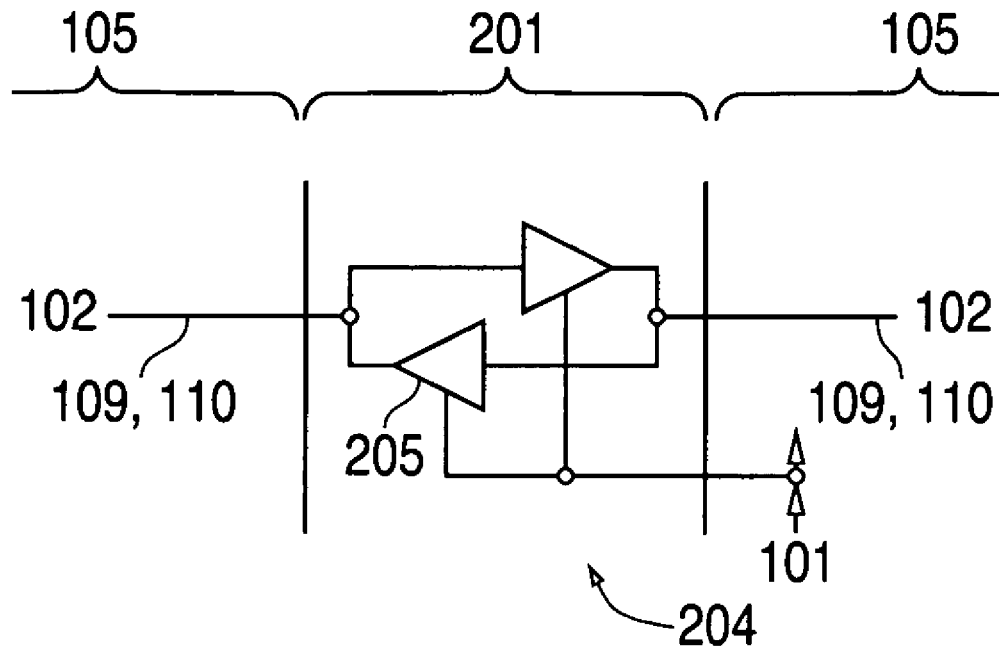
FIG. 15 is a schematic block diagram showing a sixth modification.

In addition, processing data in the array-type processor are transferred in substantially the row direction, but this transfer is limited to substantially one direction and is not bidirectional. It is therefore also possible for the pair of buffer circuits 205 having reciprocating ON/OFF states to be controlled in common by state control unit 101 of element area 105, which, as shown in FIG. 15, is a subsequent stage in the direction of transfer of processing data.

Figure 16:
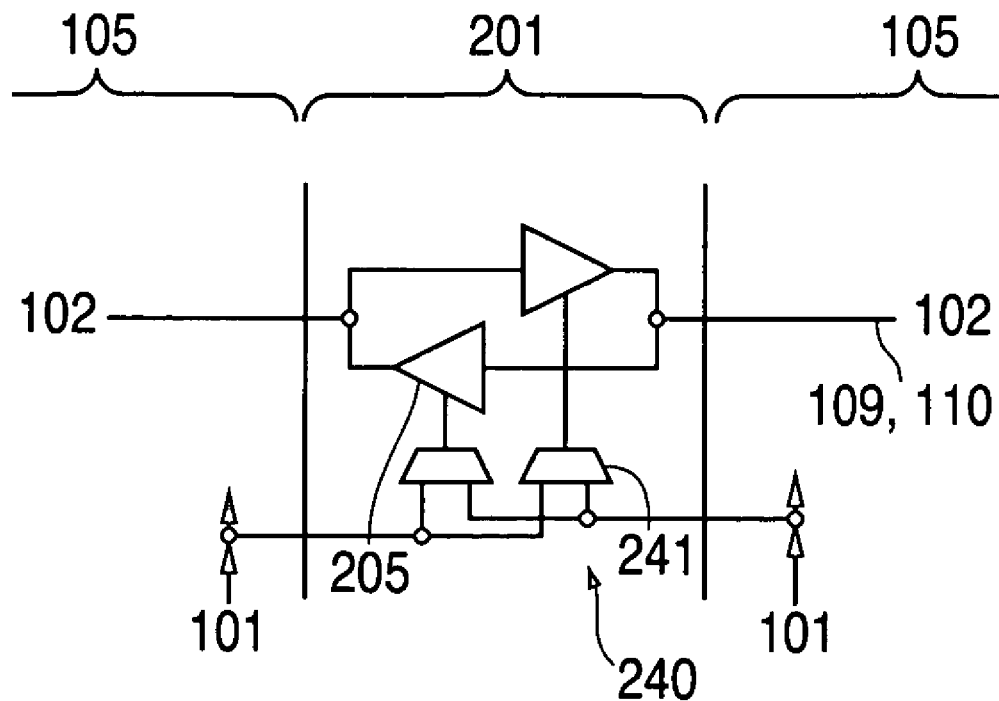
FIG. 16 is a schematic block diagram showing a seventh modification.

Further, as shown in FIG. 16, it is possible for both of the pair of buffer circuits 205 of transfer moderation circuit 240 to be connected to state control units 101 of element areas 105 on both sides by way of selector circuits 241, and for state control units 101 of element areas 105 on both sides to freely control the pair of buffer circuits 205 of transfer moderation circuit 240.

Figure 17:
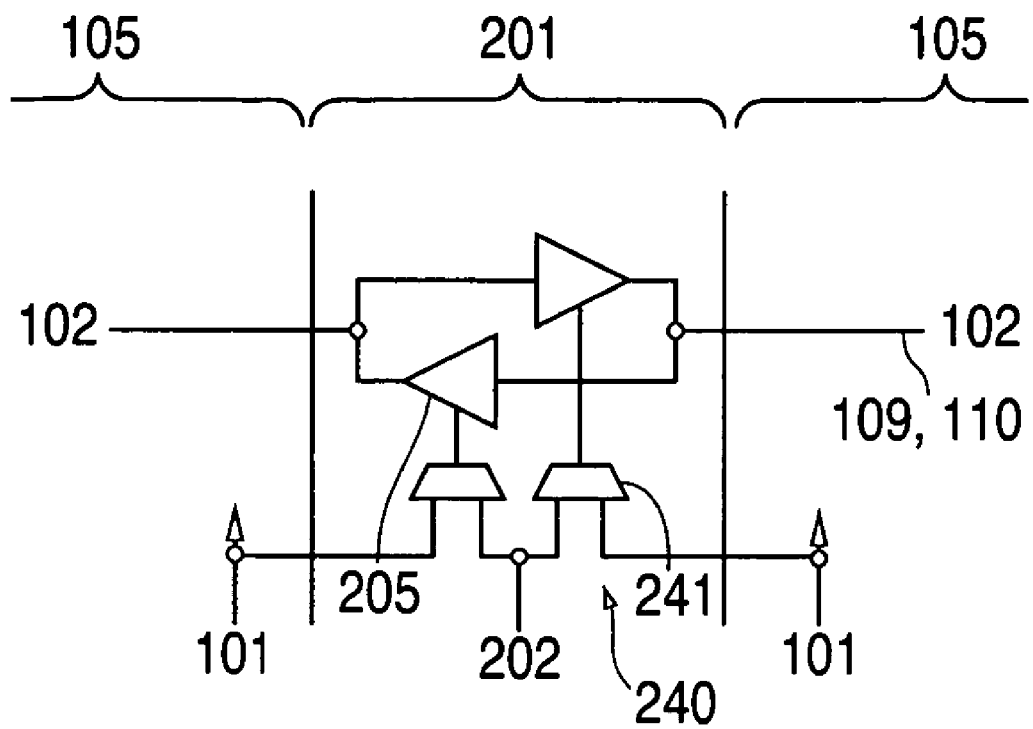
FIG. 17 is a schematic block diagram showing an eighth modification.

In addition, as shown in FIG. 17, it is possible for both of the pair of buffer circuits 205 of transfer moderation circuit 240 to be individually connected by way of selector circuits 241 to central control unit 202 and to state control units 101 of element areas 105 of the succeeding section and for central control unit 202 and state control unit 101 of element area 105 of the succeeding section to control buffer circuits 205 of transfer moderation circuit 240.

Figure 18:
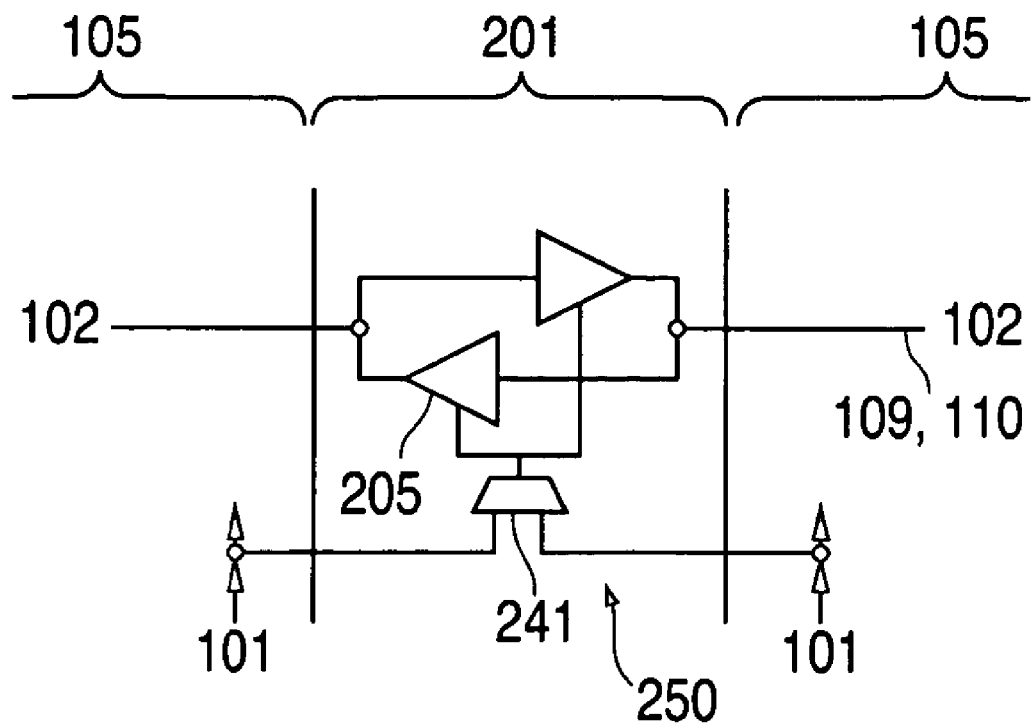
FIG. 18 is a schematic block diagram showing a ninth modification.

Further, in transfer moderation circuit 250 in which the ON/OFF states of the pair of buffer circuits 205 reciprocate, it is possible for this pair of buffer circuits 205 to be connected by way of one selector circuit 241 to state control units 101 of element areas 105 on both sides as shown in FIG. 18, and for state control units 101 of element areas 105 on both sides to control the switching of the direction of transfer of processing data of transfer moderation circuit 250.

Figure 19:
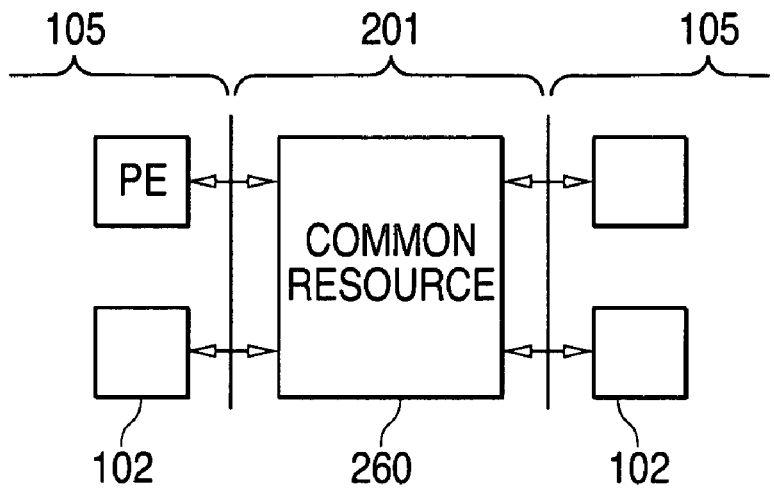
FIG. 19 is a schematic block diagram showing a tenth modification.

Further, although a case was described in the above-described embodiment in which transfer moderation circuit 204 is arranged in buffer region 201, it is also possible for common resource 260 to be arranged in buffer region 201, as shown in FIG. 19. This common resource 260 is composed of, for example, data holding circuit for temporarily holding processing data that are transferred from processor elements 102 and data operation circuits for executing specific operations on processing data that have been transferred from processor elements 102, and as shown in FIG. 19, is shared by processor elements 102 of element areas 105 on both sides of buffer region 201.

The above-described arrangement of common resource 260 in buffer region 201 and the sharing of common resource 260 by processor elements 102 of element areas 105 on both sides allows processor elements 102 of element areas 105 on both sides to use hardware that is not arranged in each and every element area 105 as common resource 260.

Figure 20A:
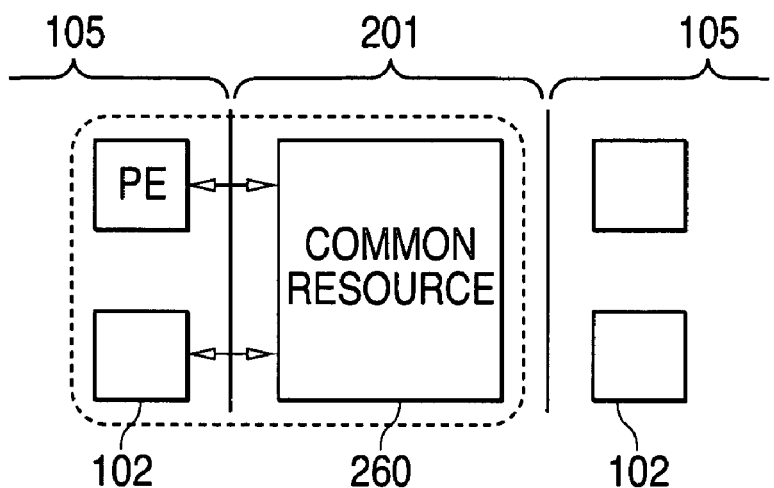
FIGS. 20A and 20B are schematic block diagrams showing an eleventh modification.

As the control that allows sharing of common resources 260 by processor elements 102 of element areas 105 on both sides, it is possible for the control of all common resources 260 that are positioned in buffer region 201 to be occupied by one of element areas 105 on the two sides, as shown in FIG. 20A. This form, while reducing the degree of freedom of the use of common resource 260, allows a simplification of the control.

Figure 20B:
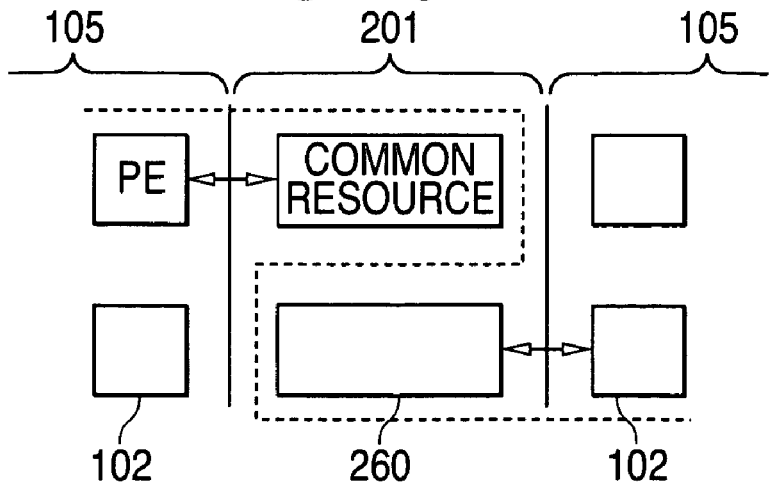

Alternatively, it is possible for the control of each of common resources 260 that are located in buffer region 201 to be selectively occupied by one of element areas 105 on the two sides as shown in FIG. 20B, whereby the control becomes more complex but the degree of freedom of using common resources 260 can be improved.

Still further, it is possible for the control terminals of common resource 260 to be connected as one pair to each of state control units 101 of element areas 105 on the two sides, the input terminal of common resource 260 being occupied by one of element areas 105 on the two sides and the output terminal being occupied by the other of element areas 105 (not shown in the figure).

For example, when the direction of transfer of processing data in array-type processor 200 is fundamentally from the left side to the right side in FIG. 8, the input terminal of common resource 260 is preferably occupied by element area 105 on the left side and the output terminal is preferably occupied by element area 105 on the right side.

Figure 21:
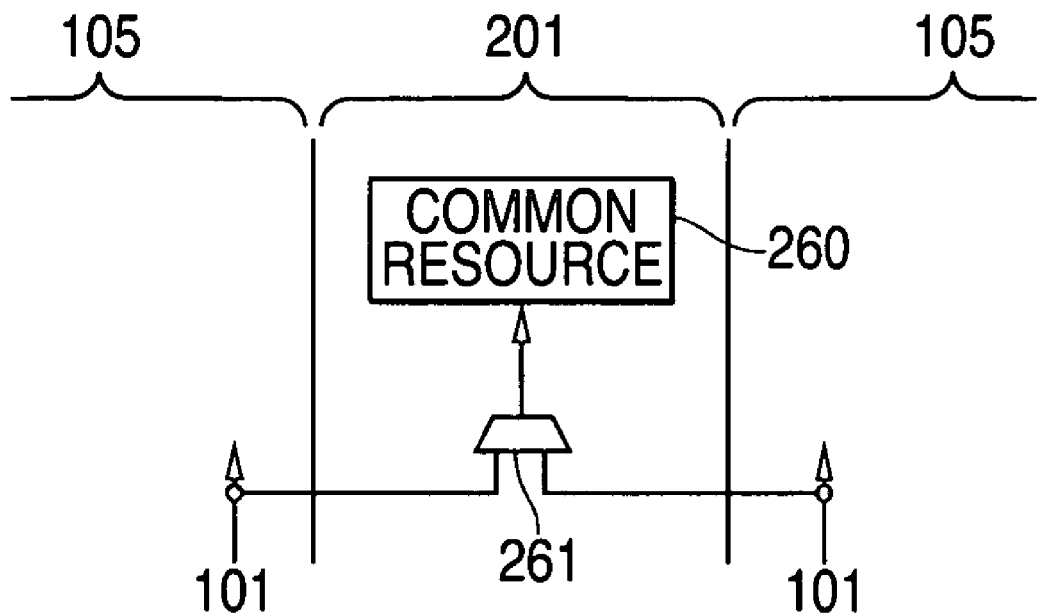
FIG. 21 is a schematic block diagram showing a twelfth modification.

The mechanism for switching the occupation of common resource 260 as described hereinabove can be formed similar to the previously described mechanism for switching transfer moderation circuits 204, as shown in FIG. 21. In other words, common resource 260 is connected by way of one selector circuit 261 to state control units 101 of element areas 105 on both sides, and the switching of the occupation of common resource 260 can be controlled by element areas 105 on both sides by means of state control units 101.

Figure 22:
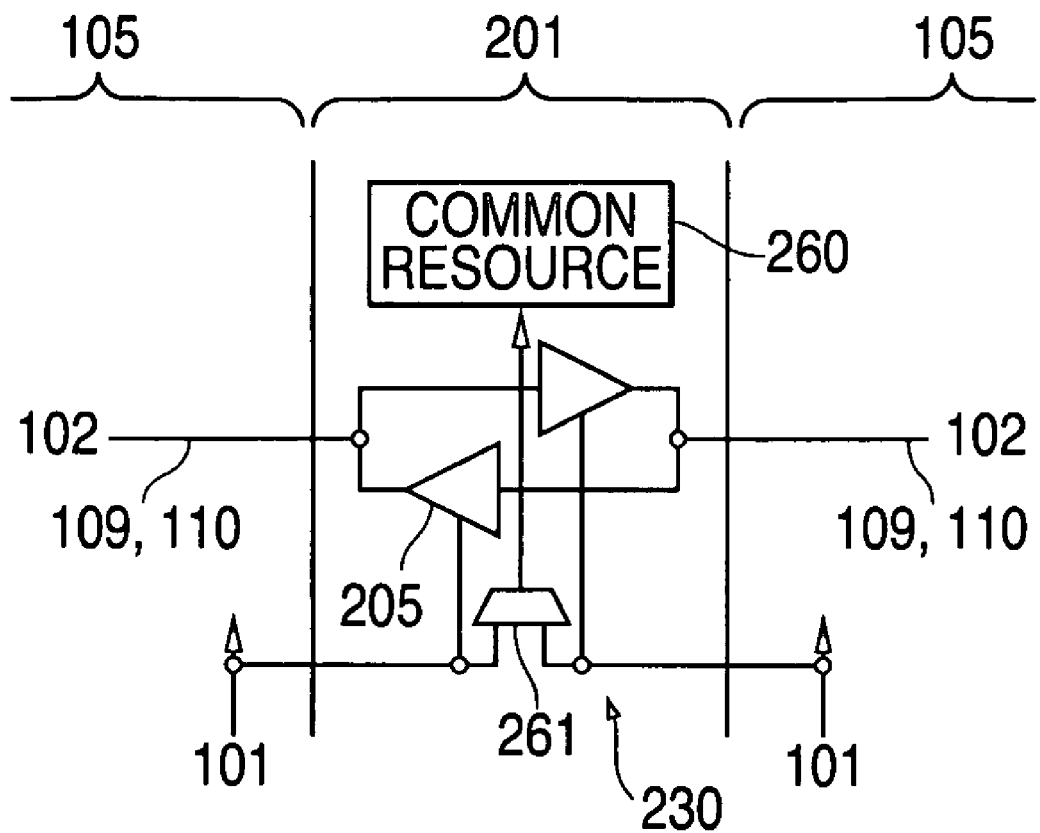
FIG. 22 is a schematic block diagram showing a thirteenth modification.

As shown in FIG. 22, in transfer moderation circuit 250 in which the ON/OFF states of the pair of buffer circuits 205 reciprocate, this pair of buffer circuits 205 can be connected by way of one selector circuit 261 to state control units 101 of element areas 105 on both sides, and these state control units 101 can be connected to common resource 260 by way of selector circuit 261.

In this case, state control units 101 of element areas 105 on both sides can simultaneously control switching of the direction of transfer of processing data in transfer moderation circuit 250 and switching of which of element areas 105 on the two sides occupies common resource 260.

Figure 23:
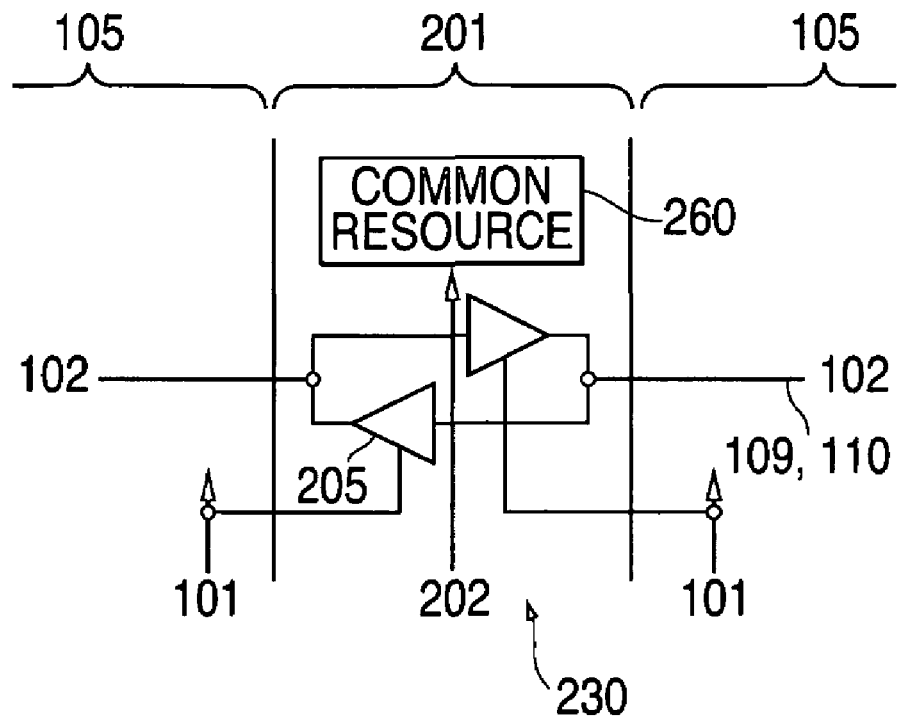
FIG. 23 is a schematic block diagram showing a fourteenth modification.

Alternatively, as shown in FIG. 23, it is possible for the pair of buffer circuits 205 of transfer moderation circuit 250 in which the ON/OFF states reciprocate to be connected to state control units 101 of element areas 105 on both sides, and for common resource 260 to be connected to center control unit 202.

Figure 24:
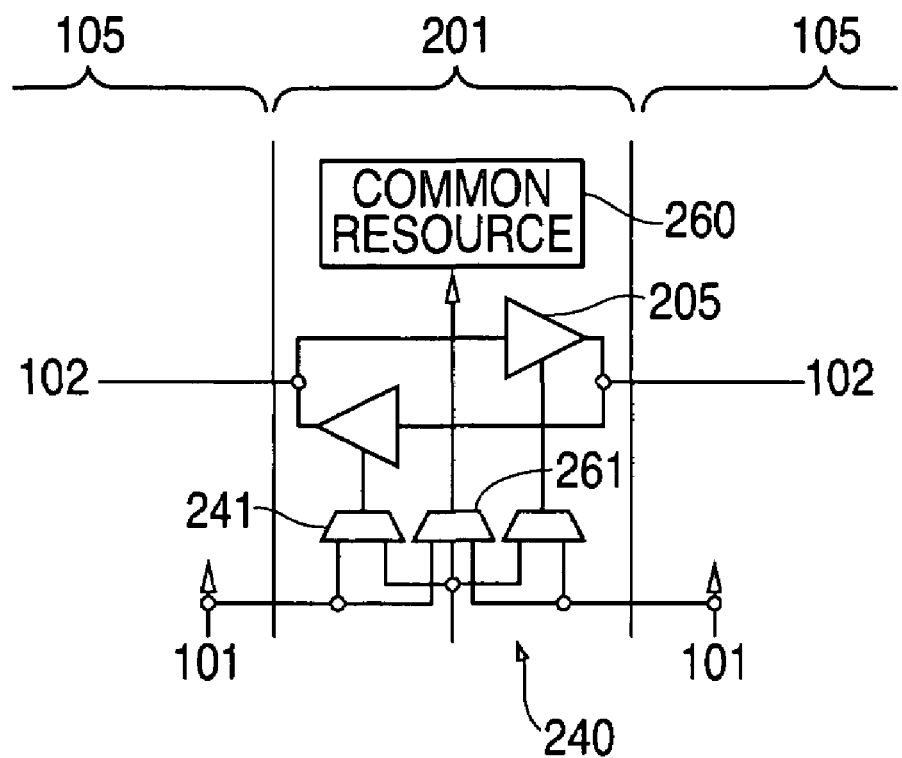
FIG. 24 is a schematic block diagram showing a fifteenth modification.

Finally, as shown in FIG. 24, it is possible for both of the pair of buffer circuits 205 of transfer moderation circuit 240 to be connected to each of central control unit 202 and state control units 101 of element areas 105 on the side of the succeeding stage by way of selector circuits 241, and for state control units 101 of element areas 105 on both sides and central control unit 202 to be connected by way of selector circuit 261 to common resource 260.

While preferred embodiments of the present invention have been described using specific terms, such description is for illustrative purposes only, and it is to be understood that changes and variations may be made without departing from the spirit or scope of the following claims.

What is claimed is:

1. An array-type processor, comprised of a plurality of processor elements that individually perform data processing in accordance with instruction codes provided by a plurality of state control units, and having switch-controlled connections between the processor elements, wherein the processor elements are arranged in rows and columns; and wherein the processor elements are further arranged in a plurality of element areas, each element area comprising a plurality of processor elements and a respective one of the plurality of state control units connected to the plurality of processor elements on a same plane as the plurality of processor elements and providing instruction codes to the plurality of processor elements,
wherein the state control units issue instruction codes to the plurality of processor elements in each respective element area in every cycles,
wherein buffer regions are formed between adjacent ones of said plurality of element areas;
wherein transfer moderation circuits are arranged in said buffer regions for moderating data transfers of said processor elements of said plurality of element areas on both sides of said buffer regions;
wherein a central control unit is arranged at a central position with respect to the buffer regions, wherein the central control unit intercommunicates with the plurality of state control units to control operations of said transfer moderation circuits;
wherein said transfer moderation circuits each comprise a pair of buffer circuits that are arranged in parallel and that have reciprocal directions of data transfer,
wherein a first subset of said buffer regions form a single column in which said central control unit is also disposed, and
wherein a second subset of said buffer regions form a single row in which said central control unit is also disposed.

2. An array-type processor according to claim 1, wherein:
the plurality of processor elements of each element area are arranged in a matrix of rows and columns;
the respective one of the state control units of each element area is positioned as at least one additional row of the matrix on the same plane within said element area; and
the state control units of the plurality of element areas are arranged in columns within the array processor.

3. An array-type processor according to claim 2, wherein the plurality of element areas are arranged in a row direction.

4. An array-type processor according to claim 1, wherein:
the plurality of processor elements of each element area are arranged in a matrix of rows and columns;
the respective one of the state control units of each element area is positioned as at least one additional row of the matrix within said element area;
the plurality of element areas are arranged in rows and columns within the array processor;
the state control units of the plurality of element areas are arranged in columns within the array processor; and
the state control units of adjacent element areas are arranged at confronting positions.

5. An array-type processor according to claim 1, wherein an operation of said transfer moderation circuits is controlled by said state control units of at least one of said element areas on both sides.

6. An array-type processor according to claim 1, wherein a common resource that is shared by said processor elements of said element areas on both sides is arranged in said buffer region.

7. An array-type processor according to claim 6, wherein said common resource includes a data holding circuit for temporarily holding processing data that are transferred from said processor elements.

8. An array-type processor according to claim 6, wherein said common resource includes a data operation circuit for executing a specific operation on processing data that have been transferred from said processor elements.

9. An array-type processor according to claim 6, wherein said state control unit of at least one of said plurality of element areas on both sides of said common resource controls whether said common resource is able to be utilized by either of said element areas on both sides.

10. An array-type processor according to claim 6, wherein said state control unit of at least one of said plurality of element areas on both sides of said buffer regions both controls an operation of said transfer moderation circuit and controls whether said common resource is able to be utilized by either of said element areas on both sides of said common resource.

11. An array-type processor according to claim 1, wherein the state control units intercommunicate to realize linked operation.

12. An array-type processor according to claim 1, wherein the state control units intercommunicate to realize linked operation.

13. An array-type processor according to claim 6, wherein the state control units intercommunicate to realize linked operation.

14. An array-type processor, comprised of a multiplicity plurality of processor elements that individually perform data processing in accordance with instruction codes provided by state control units, and having switch-controlled connections between the processor elements,
wherein the state control units successively switch the instruction codes provided to the processor elements to cause successive transitions of operating states of the processor elements in accordance with transition rules of a transition table memory;
wherein the processor elements are arranged in rows and columns; and
wherein the processor elements are further arranged in a plurality of element areas, each element area comprising a plurality of processor elements and a respective one of the plurality of state control units connected to the plurality of processor elements on a same plane as the plurality of processor elements and providing instruction codes to the plurality of processor elements,
wherein the state control units issue instruction codes to the plurality of processor elements in each respective element area in every cycles,
wherein buffer regions are formed between adjacent ones of said plurality of element areas;
wherein transfer moderation circuits are arranged in said buffer regions for moderating data transfers of said processor elements of said plurality of element areas on both sides of said buffer regions;
wherein a central control unit is arranged at a central position with respect to the buffer regions, wherein the central control unit intercommunicates with the plurality of state control units to control operations of said transfer moderation circuits;
wherein said transfer moderation circuits each comprise a pair of buffer circuits that are arranged in parallel and that have reciprocal directions of data transfer,
wherein a first subset of said buffer regions form a single column in which said central control unit is also disposed, and
wherein a second subset of said buffer regions form a single row in which said central control unit is also disposed.

15. An array-type processor according to claim 14, wherein:
the plurality of processor elements of each element area are arranged in a matrix of rows and columns;
the respective one of the state control units of each element area is formed in a shape that is equivalent to at least one row of the matrix within said element area; and
the state control units of the plurality of element areas are arranged in columns on the same plane as the plurality of element areas within the array processor.

16. An array-type processor according to claim 15, wherein the plurality of element areas are arranged in a row direction.

17. An array-type processor according to claim 14, wherein:
the plurality of processor elements of each element area are arranged in a matrix of rows and columns;
the respective one of the state control units of each element area is formed in a shape that is equivalent to at least one row of the matrix within said element area;
the plurality of element areas are arranged in rows and columns within the array processor;
the state control units of the plurality of element areas are arranged in columns within the array processor; and
the state control units of adjacent element areas are arranged at confronting positions.

18. An array-type processor according to claim 14, wherein an operation of said transfer moderation circuits is controlled by said state control units of at least one of said element areas on both sides.

19. An array-type processor according to claim 14, wherein a common resource that is shared by said processor elements of said element areas on both sides is arranged in said buffer region.

20. An array-type processor according to claim 19, wherein said common resource includes a data holding circuit for temporarily holding processing data that are transferred from said processor elements.

21. An array-type processor according to claim 19, wherein said common resource includes a data operation circuit for executing a specific operation on processing data that have been transferred from said processor elements.

22. An array-type processor according to claim 19, wherein the respective one of the state control units of at least one of said element areas on both sides of said common resource controls whether said common resource is occupied by either of said element areas on both sides.

23. An array-type processor according to claim 19, the respective one of the state control units of at least one of said element areas on both sides of said buffer regions both controls an operation of said transfer moderation circuit and controls whether said common resource is occupied by either of said element areas on both sides of said common resource.

24. An array-type processor according to claim 14, wherein the state control units intercommunicate to realize linked operation.

25. An array-type processor according to claim 12, wherein the state control units intercommunicate to realize linked operation.

26. An array-type processor according to claim 19, wherein the state control units intercommunicate to realize linked operation.

27. An array-type processor according to claim 14, wherein:
the plurality of processor elements are divided into a number of element areas that corresponds to a number of said state control units, such that one of said state control units and a corresponding plurality of processor elements are in each element area of the plurality of element areas.

28. The array-type processor of claim 1, wherein a state control unit of a first element area of the plurality of element areas is able to communicate with a state control unit of a second element area of the plurality of element areas, such that the state control unit of the first element area is able to cooperate with the state control unit of the second element area to realize a linked operation of the first element area and the second element area.

29. The array-type processor of claim 28, wherein the state control unit of the first element area and the state control unit of the second element area are configured to cooperate with each other to control a particular linked operation of having each of the plurality of processor elements of the first element area execute a same state transition of data processing as each of the plurality of processor elements of the second element area.

30. The array-type processor of claim 28, wherein the respective one of the state control units of the first element area and the respective one of the state control units of the second element area are configured to cooperate with each other to control a particular linked operation of having each of the plurality of processor elements of the first element area execute a different state transition of data processing than each of the plurality of processor elements of the second element area.

31. The array-type processor of claim 28, wherein the respective one of the state control units of the first element area and the respective one of the state control units of the second element area are configured to cooperate with each other to control a particular linked operation of having each of the plurality of processor elements of the first element area and each of the plurality of processor elements of the second element area execute specifically assigned state transitions of data processing.

32. The array-type processor of claim 1, wherein two or more of the state control units are configured to intercommunicate with each other to realize a particular linked operation of having a same state transition of data processing be executed in a corresponding two or more element areas of the plurality of element areas.

33. The array-type processor of claim 1, wherein two or more of the state control units are configured to intercommunicate with each other to realize a particular linked operation of having specifically assigned state transitions of data processing be executed in a corresponding two or more element areas of the plurality of element areas.

34. The array-type processor of claim 1, wherein the plurality of processor elements of each element area of the plurality of element areas are arranged in a matrix of rows and columns within the element area;
wherein the respective one of the state control units of each element area of the plurality of element areas is positioned in an additional outer row of the matrix within the element area;
wherein the plurality of element areas are arranged in rows and columns within the array-type processor; and
wherein the respective one of the state control units of a first element area of the plurality of element areas is positioned to confront a corresponding one of the state control units of a second element area of the plurality of element areas such that there are no processor elements located between the respective one of the state control units of the first element area and the corresponding one of the state control units of the second element area.

35. The array-type processor of claim 1, wherein the plurality of processor elements of each element area of the plurality of element areas are arranged in a matrix of rows and columns within the element area, the matrix having more columns than rows;

wherein the respective one of the state control units of each element area of the plurality of element areas is positioned in an additional row of the matrix within the element area, the additional row being a center row of the matrix; and wherein the plurality of element areas are arranged in a single row within the array-type processor.

36. The array-type processor of claim 14, wherein a respective one of the state control units of a first element area of the plurality of element areas is able to communicate with a respective one of the state control units of a second element area of the plurality of element areas, such that the respective one of the state control units of the first element area is able to cooperate with the respective one of the state control units of the second element area to realize a linked operation of the first element area and the second element area.

37. The array-type processor of claim 36, wherein the respective one of the state control units of the first element area and the respective one of the state control units of the second element area are configured to cooperate with each other to control a particular linked operation of having each of the plurality of processor elements of the first element area execute a same state transition of data processing as each of the plurality of processor elements of the second element area.

38. The array-type processor of claim 36, wherein the respective one of the state control units of the first element area and the respective one of the state control units of the second element area are configured to cooperate with each other to control a particular linked operation of having each of the plurality of processor elements of the first element area execute a different state transition of data processing than each of the plurality of processor elements of the second element area.

39. The array-type processor of claim 36, wherein the respective one of the state control units of the first element area and the respective one of the state control units of the second element area are configured to cooperate with each other to control a particular linked operation of having each of the plurality of processor elements of the first element area and each of the plurality of processor elements of the second element area execute specifically assigned state transitions of data processing.

40. The array-type processor of claim 14, wherein two or more of the state control units are configured to intercommunicate with each other to realize a particular linked operation of having a same state transition of data processing be executed in a corresponding two or more element areas of the plurality of element areas.

41. The array-type processor of claim 14, wherein two or more of the state control units are configured to intercommunicate with each other to realize a particular linked operation of having specifically assigned state transitions of data processing be executed in a corresponding two or more element areas of the plurality of element areas.

42. The array-type processor of claim 14, wherein the plurality of processor elements of each element area of the plurality of element areas are arranged in a matrix of rows and columns within the element area;

wherein the respective one of the state control units of each element area of the plurality of element areas is positioned in an additional outer row of the matrix within the element area;

wherein the plurality of element areas are arranged in rows and columns within the array-type processor; and wherein the respective one of the state control units of a first element area of the plurality of element areas is positioned to confront a corresponding one of the state control units of a second element area of the plurality of element areas such that there are no processor elements located between the respective one of the state control units of the first element area and the corresponding one of the state control units of the second element area.

43. The array-type processor of claim 14, wherein the plurality of processor elements of each element area of the plurality of element areas are arranged in a matrix of rows and columns within the element area, the matrix having more columns than rows;

wherein the respective one of the state control unit of each element area of the plurality of element areas is positioned in an additional row of the matrix within the element area, the additional row being a center row of the matrix; and wherein the plurality of element areas are arranged in a single row within the array-type processor.

* * * * *